US011490297B2

(12) United States Patent
Jassal

(10) Patent No.: US 11,490,297 B2
(45) Date of Patent: Nov. 1, 2022

(54) METHODS FOR USER EQUIPMENT CAPABILITY REPORTING OF SIMULTANEOUS CONNECTIVITY HANDOVER

(71) Applicant: Aman Jassal, Kanata (CA)

(72) Inventor: Aman Jassal, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/034,417

(22) Filed: Sep. 28, 2020

(65) Prior Publication Data

US 2021/0105673 A1    Apr. 8, 2021

Related U.S. Application Data

(60) Provisional application No. 62/910,176, filed on Oct. 3, 2019.

(51) Int. Cl.
| | | |
|---|---|---|
| *H04W 4/00* | (2018.01) | |
| *H04W 36/00* | (2009.01) | |
| *H04W 8/24* | (2009.01) | |
| *H04W 72/04* | (2009.01) | |

(52) U.S. Cl.
CPC ......... *H04W 36/0069* (2018.08); *H04W 8/24* (2013.01); *H04W 36/0066* (2013.01); *H04W 36/00835* (2018.08); *H04W 72/0406* (2013.01)

(58) Field of Classification Search
CPC ......... H04W 8/22; H04W 8/24; H04W 8/245; H04W 36/0066; H04W 36/0069; H04W 36/0083; H04W 36/00835; H04W 72/0406

See application file for complete search history.

(56) References Cited

U.S. PATENT DOCUMENTS

| | | | | |
|---|---|---|---|---|
| 2017/0318546 | A1* | 11/2017 | Suzuki | H04W 52/34 |
| 2019/0281523 | A1* | 9/2019 | Lee | H04W 36/30 |
| 2019/0349897 | A1* | 11/2019 | Hosseini | H04W 28/12 |
| 2020/0314710 | A1* | 10/2020 | Paladugu | H04W 36/0079 |

OTHER PUBLICATIONS

"3rd Generation Partnership Project; Technical Specification Group Radio Access Network; NR; Physical layer procedures for control" (Release 15), Technical Specification, 3GPP TS 38.213 V15.6.0, Jun. 2019, 107 pages.

"3rd Generation Partnership Project; Technical Specification Group Radio Access Network; NR; Physical layer procedures for data" (Release 15), Technical Specification, 3GPP TS 38.214 V15.6.0, Jun. 2019, 105 pages.

(Continued)

*Primary Examiner* — Matthew W Genack

(57) ABSTRACT

Aspects of the present disclosure propose solutions to a problem of mobility interruption during handover between base stations by providing a UE with mechanisms to report the UE capability for simultaneous connectivity based handover, or so-called Dual Active Protocol Stack Handover (DAPS-HO). A UE reports the DAPS-HO capability of the UE to the network and then the base station initiates physical layer procedures to carry out DAPS-HO in accordance with the DAPS-HO capability reported by the UE. Aspects of the present disclosure also provide examples of signaling that may be used by the UE for reporting DAPS-HO capability to the network and the physical layer procedures that the UE may follow in accordance with the configuration that the network provides to the UE, which should be in accordance with the UE's capability.

20 Claims, 16 Drawing Sheets

```
-- ASN1START
-- TAG-FEATURESETDOWNLINK-START
FeatureSetDownlink-v16xx ::= SEQUENCE {
    bandID                      bandID,
    simultaneousRxPDCCH         ENUMERATED {supported}              OPTIONAL,
    simultaneousRxPDSCH         ENUMERATED {supported}              OPTIONAL,
    simultaneousTxPUCCH         ENUMERATED {supported}              OPTIONAL,
    simultaneousTxPUSCH         ENUMERATED {supported}              OPTIONAL,
    multipleTimingAdvance       ENUMERATED {supported}              OPTIONAL,
    tdm-Pattern-PDCCH           ENUMERATED {s2, s5, s10, s20}       OPTIONAL,
    tdm-Pattern-PDSCH           ENUMERATED {s2, s5, s10, s20}       OPTIONAL,
    tdm-Pattern-PUCCH           ENUMERATED {s2, s4, s5, s10, s20}   OPTIONAL,
    tdm-Pattern-PUSCH           ENUMERATED {s2, s4, s5, s10, s20}   OPTIONAL,
    ulPowerSharing              ENUMERATED {dynamic, semiStatic}    OPTIONAL,
    maxNumCandidateTargetCells  ENUMERATED {2,3,…}                  OPTIONAL,
}

-- TAG-FEATURESETDOWNLINK-STOP
-- ASN1STOP
```

750

(56) References Cited

OTHER PUBLICATIONS

"3rd Generation Partnership Project; Technical Specification Group Radio Access Network; NR; Radio Resource Control (RRC) protocol specification" (Release 15), Technical Specification, 3GPP TS 38.331 V15.6.0, Jun. 2019, 519 pages.
"3rd Generation Partnership Project; Technical Specification Group Radio Access Network; NR; User Equipment (UE Yadio access capabilities" (Release 15), Technical Specification, 3GPP TS 38.306 V15.6.0, Jun. 2019, 53 pages.
"RAN1 Chairman's Notes", 3GPP TSG RAN WG1 Meeting #97, Reno, USA, May 2019, (103 pages, in particular section 7.2.12).
"RAN1 Chairman's Notes", 3GPP TSG RAN WG1 Meeting #98, Prague, CZ, Aug. 2019, (113 pages, in particular section 7.2.12).
Ericsson, Capability and TDM pattern negotiation for MBB. 3GPP TSG-RAN WG2#107, Prague, Czech Republic, Aug. 26-30, 2019, R2-1908974, 4 pages.
Mediatek Inc., Qualcomm Incorporated, Intel Corporation, Charter Communications, ETRI, OPPO, Huawei, HiSilicon, Xiaomi, Vivo, China Telecom, CATT, Apple, CMCC, Google Inc., ASUSTeK, ITRI, Support Dual Active Protocol Stacks to Minimize HO Interruption . 3GPP TSG RAN WG2 Meeting #106, Reno, USA, May 13-17, 2019, R2-1905892, 10 pages.
Huawei, HiSilicon, Considerations on UE capability coordination. 3GPP TSG-RAN WG2 Meeting #107, Prague, Czech Republic, Aug. 26-30, 2019, R2-1910590, 3 pages.
ZTE Corporation, Sanechips, Discussion on the capability coordination. 3GPP TSG RAN WG2 Meeting #107, Prague, Czech Republic, Aug. 26-30, 2019, R2-1910759, 4 pages.

\* cited by examiner

```
-- ASN1START
-- TAG-BANDCOMBINATIONLIST-START
BandCombinationList ::=              SEQUENCE (SIZE (1..maxBandComb)) OF BandCombination
BandCombinationList-v1540 ::=        SEQUENCE (SIZE (1..maxBandComb)) OF BandCombination-v1540
BandCombinationList-v1550 ::=        SEQUENCE (SIZE (1..maxBandComb)) OF BandCombination-v1550
BandCombinationList-v1560 ::=        SEQUENCE (SIZE (1..maxBandComb)) OF BandCombination-v1560
BandCombination ::=   SEQUENCE {
    bandList                         SEQUENCE (SIZE (1..maxSimultaneousBands)) OF BandParameters,
    featureSetCombination            FeatureSetCombinationId,
    ca-ParametersEUTRA               CA-ParametersEUTRA                             OPTIONAL,
    ca-ParametersNR                  CA-ParametersNR                                OPTIONAL,
    mrdc-Parameters                  MRDC-Parameters                                OPTIONAL,
    supportedBandwidthCombinationSet BIT STRING (SIZE (1..32))                      OPTIONAL,
    powerClass-v1530                 ENUMERATED {pc2}                               OPTIONAL
}
BandCombination-v1540::=  SEQUENCE {
    bandList-v1540                   SEQUENCE (SIZE (1..maxSimultaneousBands)) OF BandParameters-v1540,
    ca-ParametersNR-v1540            CA-ParametersNR-v1540                          OPTIONAL
}
BandCombination-v1550 ::=  SEQUENCE {
    ca-ParametersNR-v1550            CA-ParametersNR-v1550
}
BandCombination-v1560 ::=  SEQUENCE {
    ne-DC-BC                         ENUMERATED {supported}                         OPTIONAL,
    ca-ParametersNRDC                CA-ParametersNRDC                              OPTIONAL,
    ca-ParametersEUTRA-v1560         CA-ParametersEUTRA-v1560                       OPTIONAL,
    ca-ParametersNR-v1560            CA-ParametersNR-v1560                          OPTIONAL
}
-- TAG-BANDCOMBINATIONLIST-STOP
-- ASN1STOP
```

FIG. 3B

```
-- ASN1START
-- TAG-BANDCOMBINATIONLIST-START
BandCombinationList          ::= SEQUENCE (SIZE (1..maxBandComb)) OF BandCombination
BandCombinationList-v1540    ::= SEQUENCE (SIZE (1..maxBandComb)) OF BandCombination-v1540
BandCombinationList-v1550    ::= SEQUENCE (SIZE (1..maxBandComb)) OF BandCombination-v1550
BandCombinationList-v1560    ::= SEQUENCE (SIZE (1..maxBandComb)) OF BandCombination-v1560
BandCombinationList-v16xx    ::= SEQUENCE (SIZE (1..maxBandComb)) OF BandCombination-v16xx BandCombination ::=  SEQUENCE {
    bandList                            SEQUENCE (SIZE (1..maxSimultaneousBands)) OF BandParameters,
    featureSetCombination               FeatureSetCombinationId,
    ca-ParametersEUTRA                  CA-ParametersEUTRA                          OPTIONAL,
    ca-ParametersNR                     CA-ParametersNR                             OPTIONAL,
    mrdc-Parameters                     MRDC-Parameters                             OPTIONAL,
    supportedBandwidthCombinationSet    BIT STRING (SIZE (1..32))                   OPTIONAL,
    powerClass-v1530                    ENUMERATED {pc2}                            OPTIONAL
}

BandCombination-v1540::= SEQUENCE {
    bandList-v1540                      SEQUENCE (SIZE (1..maxSimultaneousBands)) OF BandParameters-v1540
    ca-ParametersNR-v1540               CA-ParametersNR-v1540                       OPTIONAL
}

BandCombination-v1550 ::= SEQUENCE {
    ca-ParametersNR-v1550               CA-ParametersNR-v1550
}

BandCombination-v1560 ::= SEQUENCE {
    ne-DC-BC                            ENUMERATED {supported}                      OPTIONAL,
    ca-ParametersNRDC                   CA-ParametersNRDC                           OPTIONAL,
    ca-ParametersEUTRA-v1560            CA-ParametersEUTRA-v1560                    OPTIONAL,
    ca-ParametersNR-v1560               CA-ParametersNR-v1560                       OPTIONAL
}

BandCombination-v16xx ::= SEQUENCE {
    dapsHandover                        DAPSHandover                                OPTIONAL
}
-- TAG-BANDCOMBINATIONLIST-STOP
-- ASN1STOP
```

FIG. 4B

```
DAPSHandover ::=        SEQUENCE {
  bandID                          bandID
  simultaneousRxPDCCH             ENUMERATED {supported}        OPTIONAL,
  simultaneousRxPDSCH             ENUMERATED {supported}        OPTIONAL,
  simultaneousTxPUCCH             ENUMERATED {supported}        OPTIONAL,
  simultaneousTxPUSCH             ENUMERATED {supported}        OPTIONAL,
  multipleTimingAdvance           ENUMERATED {supported}        OPTIONAL,
  tdm-Pattern-PDCCH               ENUMERATED {supported}        OPTIONAL,
  tdm-Pattern-PDSCH               ENUMERATED {supported}        OPTIONAL,
  tdm-Pattern-PUCCH               ENUMERATED {supported}        OPTIONAL,
  tdm-Pattern-PUSCH               ENUMERATED {supported}        OPTIONAL,
  dynamicULPowerSharing           ENUMERATED {supported}        OPTIONAL,
  semiStaticULPowerSharing        ENUMERATED {supported}        OPTIONAL,
  maxNumCandidateTargetCells      ENUMERATED {2,3,...}          OPTIONAL,
  ..
}
```
530

FIG. 5B

```
DAPSHandover ::=        SEQUENCE {
  simultaneousRxPDCCH             SimultaneousRxPDCCH           OPTIONAL,
  ..
}
SimultaneousRxPDCCH ::=  SEQUENCE {
  maxNumCORESETs                  ENUMERATED {6, 9, 12}         OPTIONAL,
  maxNumMonitoredPDCCHCandidates  ENUMERATED {10, 11, 18, 22}   OPTIONAL,
  maxNumNonOverlappedCCEs         ENUMERATED {16, 24, 28}       OPTIONAL,
  ..
}
```
540

FIG. 5C

```
DAPSHandover ::=           SEQUENCE {
    tdm-Pattern-PUCCH              TDM-Pattern-PUCCH        OPTIONAL,
    ..
}
TDM-Pattern-PUCCH ::=      SEQUENCE {
    PUCCH-occasion-Periodicity    ENUMERATED { s2, s4, s5, s10, s20, s40, s80 }  OPTIONAL,
    PUCCH-FrequencyHopping        ENUMERATED {supported)                          OPTIONAL,
    ..
}
```

```
-- ASN1START
-- TAG-BANDCOMBINATIONLIST-START
BandCombinationList       ::=   SEQUENCE (SIZE (1..maxBandComb)) OF BandCombination
BandCombinationList-v1540 ::=   SEQUENCE (SIZE (1..maxBandComb)) OF BandCombination-v1540
BandCombinationList-v1550 ::=   SEQUENCE (SIZE (1..maxBandComb)) OF BandCombination-v1550
BandCombinationList-v1560 ::=   SEQUENCE (SIZE (1..maxBandComb)) OF BandCombination-v1560
DAPSHandoverList          ::=   SEQUENCE {SIZE (1..maxBandComb)) OF DAPSHandover BandCombination ::=   SEQUENCE {
    bandCombinationId                     BandCombinationId,
    bandList                              SEQUENCE (SIZE (1..maxSimultaneousBands)) OF BandParameters,
    featureSetCombination                 FeatureSetCombinationId,
    ca-ParametersEUTRA                    CA-ParametersEUTRA                                OPTIONAL,
    ca-ParametersNR                       CA-ParametersNR                                   OPTIONAL,
    mrdc-Parameters                       MRDC-Parameters                                   OPTIONAL,
    supportedBandwidthCombinationSet      BIT STRING (SIZE (1..32))                         OPTIONAL,
    powerClass-v1530                      ENUMERATED {pc2}                                  OPTIONAL DAPSHandover ::=   SEQUENCE {
    bandId,
    bandCombinationId                     BandCombinationId,
    simultaneousRxPDCCH                   ENUMERATED {supported}                            OPTIONAL,
    simultaneousRxPDSCH                   ENUMERATED {supported}                            OPTIONAL,
    simultaneousTxPUCCH                   ENUMERATED {supported}                            OPTIONAL,
    simultaneousTxPUSCH                   ENUMERATED {supported}                            OPTIONAL,
    multipleTimingAdvance                 ENUMERATED {supported}                            OPTIONAL,
    maxNumCandidateTargetCells            ENUMERATED {2,3,...}                              OPTIONAL,
    ...
}
-- TAG-BANDCOMBINATIONLIST-STOP
-- ASN1STOP
```

FIG. 6B

```
-- ASN1START
-- TAG-FEATURESETDOWNLINK-START
FeatureSetDownlink-v16xx ::= SEQUENCE {
    bandID                       bandID,
    simultaneousRxPDCCH          ENUMERATED {supported}                      OPTIONAL,
    simultaneousRxPDSCH          ENUMERATED {supported}                      OPTIONAL,
    simultaneousTxPUCCH          ENUMERATED {supported}                      OPTIONAL,
    simultaneousTxPUSCH          ENUMERATED {supported}                      OPTIONAL,
    multipleTimingAdvance        ENUMERATED {supported}                      OPTIONAL,
    tdm-Pattern-PDCCH            ENUMERATED {s2, s5, s10, s20}
    tdm-Pattern-PDSCH            ENUMERATED {s2, s5, s10, s20}
    tdm-Pattern-PUCCH            ENUMERATED {s2, s4, s5, s10, s20}
    tdm-Pattern-PUSCH            ENUMERATED {s2, s4, s5, s10, s20}
    ulPowerSharing               ENUMERATED {dynamic, semiStatic}            OPTIONAL,
    maxNumCandidateTargetCells   ENUMERATED {2,3,...}                        OPTIONAL,
                                                                             OPTIONAL,
                                                                             OPTIONAL,
                                                                             OPTIONAL,
}
-- TAG-FEATURESETDOWNLINK-STOP
-- ASN1STOP
```

METHODS FOR USER EQUIPMENT CAPABILITY REPORTING OF SIMULTANEOUS CONNECTIVITY HANDOVER

RELATED APPLICATIONS

This application claims the benefit of priority of U.S. Provisional Patent Application 62/910,176 filed on Oct. 3, 2019, which is hereby incorporated by reference in its entirety.

TECHNICAL FIELD

The present disclosure relates generally to wireless communications, and in particular embodiments, to user equipment capability reporting of simultaneous connectivity handover.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

A base station has a specific coverage area. Base stations are positioned so that their coverage areas overlap, to provide coverage to a larger area. When a UE travels from one location that is served by a first base station to a second location that is served by a second base station, it is necessary for the UE to be handed over from the first base station to the second base station. In conventional 3G and 4G networks, during a handover the UE can experience mobility interruption. When operating in these conventional networks, the UE releases a link with source base station and then establishes a new link with target base station.

These conventional networks support "Make-Before-Break" handover, which involves generating a link with a target cell before dropping the source cell. However, in such a scenario a mobile broadband handover (MBB-HO) solution is left to UE implementation.

Next-generation wireless networks, such as 5G New Radio (NR), are expected to support a UE simultaneously receiving transmissions from source and target cells during a handover. That means that for the duration of the handover, the UE is connected to both the source base station and the target base station.

In particular, next-generation networks are expected to support separate UE capability for Dual Active Protocol Stack Handover (DAPS-HO), with separate UE capability for NR Dual Connectivity/Carrier Aggregation (NR-DC/CA) and a dual active protocol stack (DAPS) based HO interruption reduction solution.

Therefore, improved mechanisms for DAPS-HO would be beneficial for communication systems.

SUMMARY

According to an aspect of the present disclosure there is provided a method including a UE selecting DAPS-HO UE capability information the UE is to provide to the network, the capability information indicating functionality supported by the UE during a handover from a source cell to a target cell; the UE transmitting the selected DAPS-HO capability information to the network; and the UE receiving a DAPS-HO command from the network for performing the DAPS-HO.

In some embodiments, transmitting the selected DAPS-HO capability information to the network comprises transmitting the selected DAPS-HO capability information as a subset of parameters of radio frequency (RF) parameters supported by the UE.

In some embodiments, DAPS-HO UE capability information that can be selected from includes one or more parameters of: simultaneous reception of physical downlink control channel (PDCCH) from a source cell and a target cell; simultaneous reception of physical downlink shared channel (PDSCH) from a source cell and a target cell; simultaneous transmission of physical uplink control channel (PUCCH) from a source cell and a target cell; simultaneous transmission of physical downlink shared channel (PUSCH) from a source cell and a target cell; band identifier (bandId); multiple timing advance; time division multiplexing (tdm) pattern for PDCCH; tdm pattern for PDSCH; tdm pattern for PUCCH; tdm pattern for PUSCH; maximum number of candidate target cells; and uplink power sharing between a source cell and a target cell.

In some embodiments, transmitting the selected DAPS-HO capability information to the network comprises transmitting the selected DAPS-HO capability information as a subset of a band combination list parameter.

In some embodiments, at least one of the one or more parameters include additional parameters that further define how the at least one parameter is supported.

In some embodiments, transmitting the selected DAPS-HO capability information to the network comprises transmitting the selected DAPS-HO capability information as a subset of a DAPS-HO list parameter.

In some embodiments, at least one of the one or more parameters include additional parameters that further define how the at least one parameter is supported.

In some embodiments, transmitting the selected DAPS-HO capability information to the network comprises transmitting the selected DAPS-HO capability information as a subset of a feature set parameter.

In some embodiments, at least one of the one or more parameters include additional parameters that further define how the at least one parameter is supported.

According to an aspect of the present disclosure there is provided a method including: a network receiving DAPS-HO UE capability information from a UE, the capability information indicating functionality supported by the UE during a handover from a source cell to a target cell; and the network transmitting a DAPS-HO command to the UE for performing the DAPS-HO.

In some embodiments, receiving the DAPS-HO capability information comprises receiving the DAPS-HO capability information as a subset of parameters of radio frequency (RF) parameters supported by the UE.

In some embodiments, DAPS-HO UE capability information includes one or more parameters of: simultaneous reception of PDCCH from a source cell and a target cell; simultaneous reception of PDSCH from a source cell and a target cell; simultaneous transmission of physical uplink control channel (PUCCH) from a source cell and a target cell; simultaneous transmission of physical downlink shared channel (PUSCH) from a source cell and a target cell;

bandId; multiple timing advance; tdm pattern for PDCCH; tdm pattern for PDSCH; tdm pattern for PUCCH; tdm pattern for PUSCH; maximum number of candidate target cells; and uplink power sharing between a source cell and a target cell.

In some embodiments, receiving the DAPS-HO capability information comprises receiving the DAPS-HO capability information as a subset of a band combination list parameter.

In some embodiments, at least one of the one or more parameters include additional parameters that further define how the at least one parameter is supported.

In some embodiments, receiving the DAPS-HO capability information comprises receiving the DAPS-HO capability information as a subset of a DAPS-HO list parameter.

In some embodiments, at least one of the one or more parameters include additional parameters that further define how the at least one parameter is supported.

In some embodiments, receiving the DAPS-HO capability information comprises receiving the DAPS-HO capability information as a subset of a feature set parameter.

In some embodiments, at least one of the one or more parameters include additional parameters that further define how the at least one parameter is supported.

According to an aspect of the present disclosure there is provided a method including: a UE using priority rules to determine when the UE can drop processing tasks associated with a handover from the source cell to a target cell, the priority rules based on DAPS-HO UE capability information the UE had previously provided to the network; and the UE dropping processing tasks when the processing task exceed the capability of the UE.

According to an aspect of the present disclosure there is provided a device including a processor and computer readable media having stored thereon processor executable instructions. The processor executable instructions, when executed, cause the device to: select DAPS-HO device capability information the device is to provide to a network, the capability information indicating functionality supported by the device during a handover from a source cell to a target cell; transmit the selected DAPS-HO capability information to the network; receive a DAPS-HO command from the network for performing the DAPS-HO.

In some embodiments, the processor executable instructions that cause the device to transmit the selected DAPS-HO capability information, when executed, cause the device to transmit the selected DAPS-HO capability information as a subset of parameters of radio frequency (RF) parameters supported by the UE.

In some embodiments, the DAPS-HO UE capability information that can be selected from includes one or more parameters of: simultaneous reception of physical downlink control channel (PDCCH) from a source cell and a target cell; simultaneous reception of physical downlink shared channel (PDSCH) from a source cell and a target cell; simultaneous transmission of physical uplink control channel (PUCCH) from a source cell and a target cell; simultaneous transmission of physical downlink shared channel (PUSCH) from a source cell and a target cell; multiple timing advance; band identifier (bandId); time division multiplexing (tdm) pattern for PDCCH; tdm pattern for PDSCH; tdm pattern for PUCCH; tdm pattern for PUSCH; maximum number of candidate target cells; or uplink power sharing between a source cell and a target cell.

In some embodiments, the processor executable instructions that cause the device to transmit the selected DAPS-HO capability information, when executed, cause the device to transmit the selected DAPS-HO capability information as a subset of a band combination list parameter.

According to an aspect of the present disclosure there is provided a device including a processor and computer readable media having stored thereon processor executable instructions. The processor executable instructions, when executed, cause the device to: receive dual active protocol stack handover (DAPS-HO) UE capability information from a UE, the capability information indicating functionality supported by the UE during a handover from a source cell to a target cell; and transmit a DAPS-HO command to the UE for performing the DAPS-HO.

In some embodiments, the processor executable instructions that cause the device to receive the selected DAPS-HO capability information, when executed, cause the device to receive the DAPS-HO capability information as a subset of parameters of radio frequency (RF) parameters supported by the UE.

In some embodiments, DAPS-HO UE capability information includes one or more parameters of: simultaneous reception of physical downlink control channel (PDCCH) from a source cell and a target cell; simultaneous reception of physical downlink shared channel (PDSCH) from a source cell and a target cell; simultaneous transmission of physical uplink control channel (PUCCH) from a source cell and a target cell; simultaneous transmission of physical downlink shared channel (PUSCH) from a source cell and a target cell; multiple timing advance; band identifier (bandId); time division multiplexing (tdm) pattern for PDCCH; tdm pattern for PDSCH; tdm pattern for PUCCH; tdm pattern for PUSCH; maximum number of candidate target cells; and uplink power sharing between a source cell and a target cell.

In some embodiments, the processor executable instructions that cause the device to receive the selected DAPS-HO capability information, when executed, cause the device to receive the DAPS-HO capability information as a subset of a band combination list parameter.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 3B illustrates an example of fields that may be included in a RF parameter portion of a UE NR capability message according to NR Release 15.

FIG. 4B illustrates an example of fields that may be included in a RF parameter portion of a UE NR capability message according to a first embodiment of the present disclosure.

FIG. 5B illustrates an example of fields that may be included in a new portion of a RF parameter portion of a UE NR capability message according to the first embodiment of the present disclosure.

FIG. 5C illustrates an example of fields that may be included in a simultaneous receive PDCCH field of a RF parameter portion of a UE NR capability message according to the first embodiment of the present disclosure.

FIG. 5D illustrates an example of fields that may be included in a time divisional multiplex pattern for PUCCH field of a RF parameter portion of a UE NR capability message according to the first embodiment of the present disclosure.

FIG. 6B illustrates an example of fields that may be included in a new portion of a RF parameter portion of a UE NR capability message according to the second embodiment of the present disclosure.

FIG. 7B illustrates an example of fields that may be included in a new portion of a RF parameter portion of a UE NR capability message according to the third embodiment of the present disclosure.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of the present disclosure propose solutions to a problem of mobility interruption during handover between base stations by providing a UE with mechanisms to report the UE capability for simultaneous connectivity based handover, or so-called Dual Active Protocol Stack Handover (DAPS-HO). A UE reports the DAPS-HO capability of the UE to the network and then the base station initiates physical layer procedures to carry out DAPS-HO in accordance with the DAPS-HO capability reported by the UE. Aspects of the present disclosure provide examples of signaling that may be used by the UE for reporting DAPS-HO capability to the network and the physical layer procedures that the UE may follow in accordance with the configuration that the network provides to the UE, which should be in accordance with the UE's capability.

Figure 1:
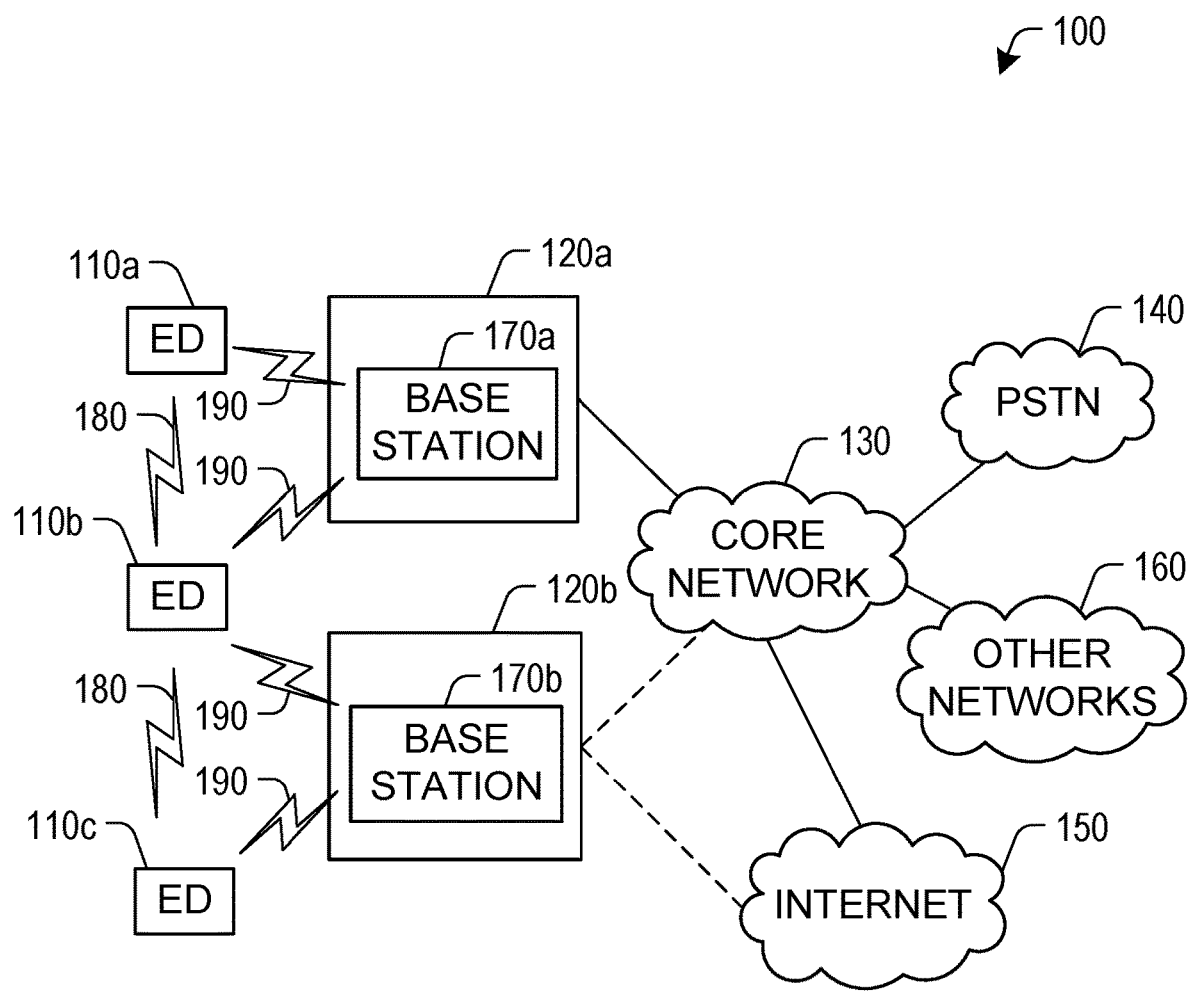
FIG. 1 is a schematic diagram of a communication system in which embodiments of the disclosure may occur.
Figure 2A:
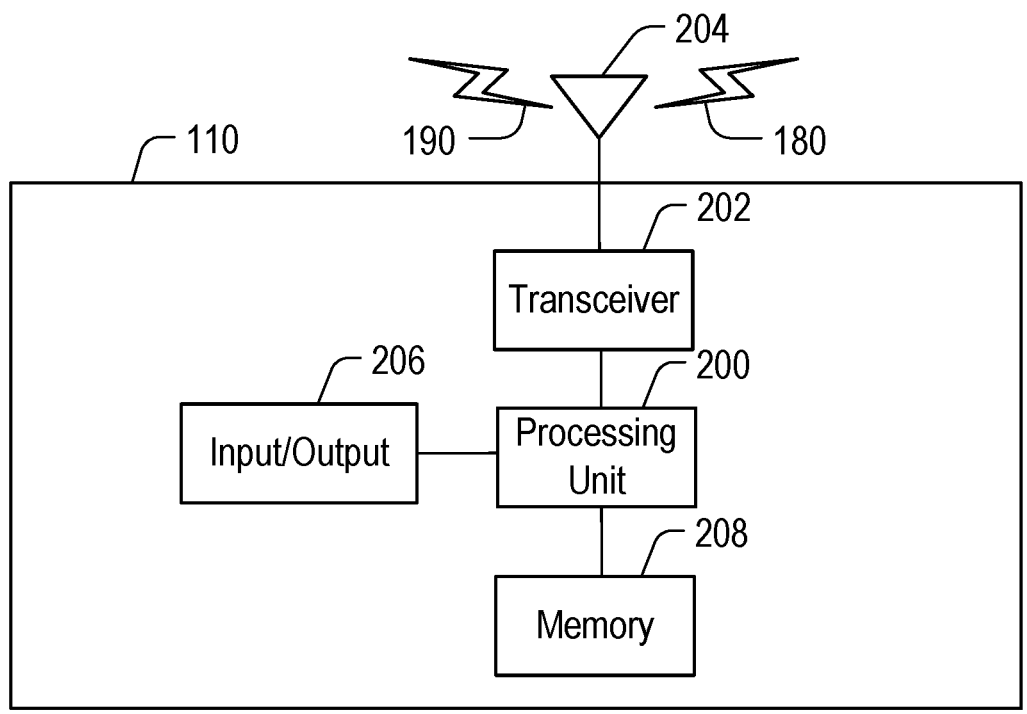
FIGS. 2A and 2B are block diagrams of an example UE and base station, respectively.
Figure 2B:
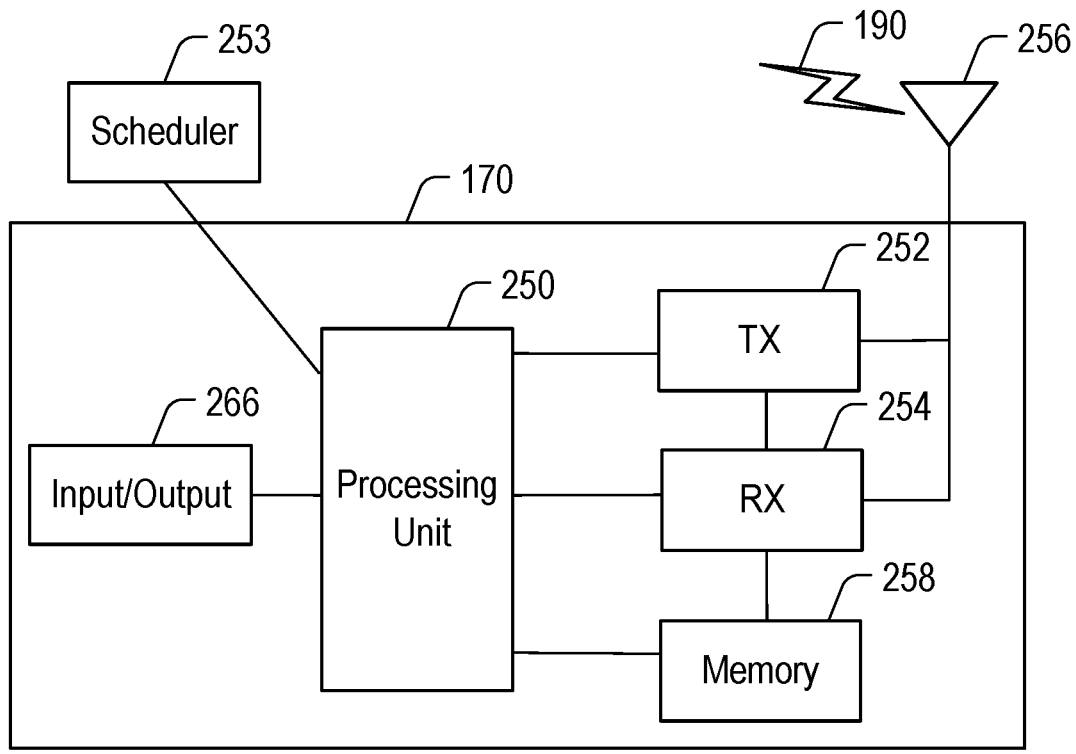

FIGS. 1, 2A, and 2B following below provide context for the network and devices that may be in the network and that may implement aspects of the present disclosure.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 directly, or via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

In this disclosure, the UL and DL transmissions between UEs and base stations may be "grant-free" transmissions or as a mode for data transmissions that are performed without communicating dynamic scheduling. Grant-free transmissions are sometimes called "configured grant", "grant-less", "schedule free", or "schedule-less" transmissions. Grant-free SL transmissions can also be referred to as SL "transmission without grant", "transmission without dynamic grant", "transmission without dynamic scheduling", or "transmission using configured grant", for example.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more side link (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In this disclosure, the SL transmissions between cooperating UEs may be "grant-free" transmissions or as a mode for data transmissions that are performed without communicating dynamic scheduling. Grant-free transmissions are sometimes called "configured grant", "grant-less", "schedule free", or "schedule-less" transmissions. Grant-free SL transmissions can also be referred to as SL "transmission without grant", "transmission without dynamic grant", "transmission without dynamic scheduling", or "transmission using configured grant", for example.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

Figure 3A:
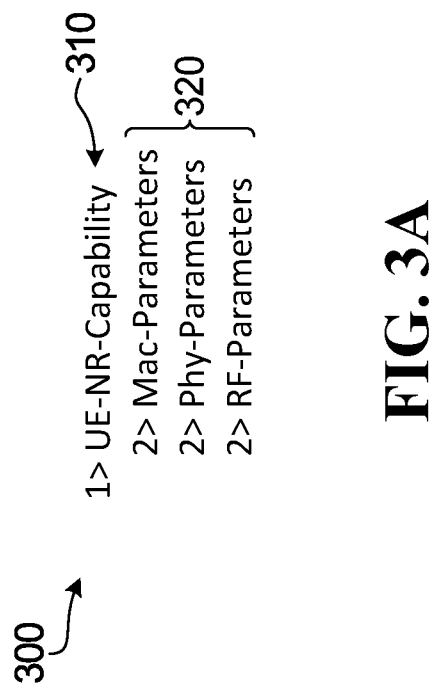
FIG. 3A illustrates a hierarchy of information in a UE New Radio (NR) capability message that would be sent by the UE to the network to indicate capabilities that the UE supports.

In NR Release 15 (R15), the UE reports capabilities that are supported by the UE. FIG. 3A illustrates a hierarchy 300 of content of a UE NR capability message (UE-NR-Capability). The hierarchy shown in FIG. 3A and the subsequent figures with the labelling of Levels 1, 2, 3, etc. is merely to facilitate an understanding of information included in the capability message and it is to be understood that there may not be explicit level labelling included with this parameter information. Level 1 310 is the capability message including all the capability information. At Level 2 320, parameters for different layers such as media access control (MAC), physical layer (PHY) and radio frequency (RF) are included. In some embodiments DAPS-HO capability information for the UE is included in the RF parameters portion of the UE NR capability message. The capability information may be sent form the UE to the network, via a source cell, using high-layer signaling. An example of such higher layer signaling may be radio resource control (RRC) signaling.

FIG. 3B illustrates an example of information 330 that may be included in various fields in the capability message from the UE to the network in the RF parameter portion of the hierarchy shown in FIG. 3A. The UE reports a supported list of carrier aggregation/dual carrier (CA/DC) bands. In particular, the UE sends the information in a BandCombinationList field 340 and a corresponding BandCombinationList-v15xx field 350. FIG. 3B includes BandCombinationList-v1540, BandCombinationList-v1550 and BandCombinationList-v1560 fields. Each band combination is associated to a set of DL/UL features 360 associated with Feature SetCombinationid 370.

Figure 9A:
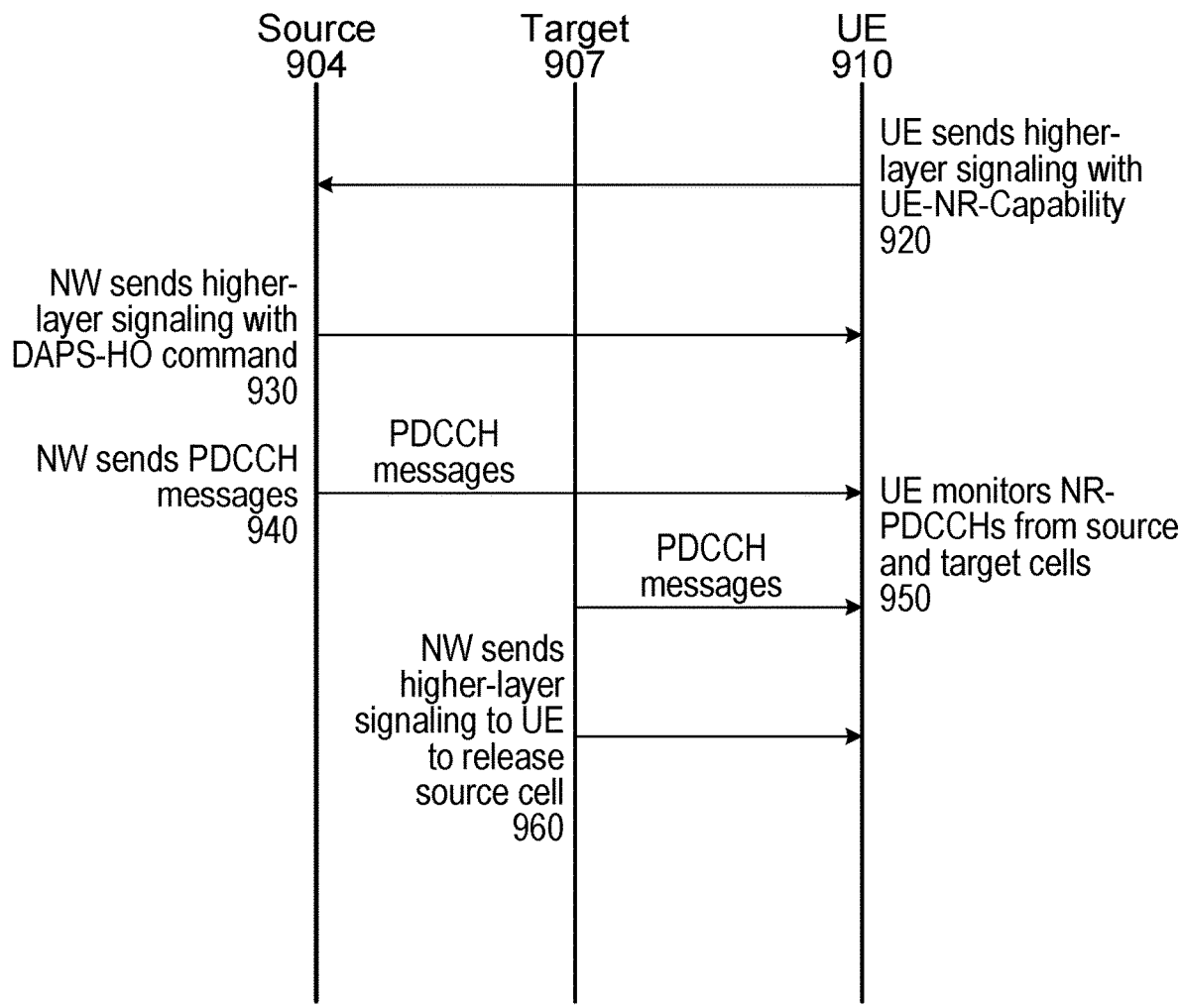
FIG. 9A is a signal flow diagram illustrating a first example of a simultaneous handover by a UE from a source cell to a target cell according to an embodiment of the present disclosure.

FIG. 9A is an example signal flow diagram illustrating signaling that occurs between a UE 910 and a source cell 904 and the UE 910 and a target cell 907 as part of a DAPS-HO. The source cell 904 and the target cell 907 are part of a network that the UE 910 is communicating over. Processing being performed by the network, such as generating a DAPS-HO command based on the UE capability information provided by the UE 910, may be localized near one of the target cell 907 or source cell 904 or somewhere else in the network. At some point prior to the possibility of a handover from the source cell 904 to the target cell 907, the UE 910 sends 920 a higher layer signaling message that includes UE-NR-Capability information. This information may include capability information regarding many capabilities that the UE supports, part of which is related to DAPS-HO capability or the capability information that is being sent to the network at a given time may be only relating to DAPS-HO capabilities that the UE supports. An example of higher-layer signaling may be radio resource control (RRC) signaling. At some point in time after the source cell 904 receives the UE capability information, the network generates a DAPS-HO command and the source cell 904 sends 930 the DAPS-HO command to the UE 910. At 940 the source cell 904 and the target cell 907 send PDDCH messages. At 950, the UE 910 monitors for PDCCH messages sent by the source cell 904 and the target cell 907 at step 940. Once the network has determined that the handover has been completed, the target cell 907 sends 960 higher-layer signaling to the UE 910 to release the source cell 904. The higher-layer signaling may be RRC signaling.

Embodiments described below are three different formats in which the UE can send capability information to the network and how the UE may react when receiving a DAPS-HO command from the network in response to the capability information.

In an embodiment, the UE sends the capability information, which may also be referred to as a capability report, to the network in a format that includes all frequency band combinations that the UE supports. For each supported band combination, the UE includes a DAPS-HO capability parameter. In this embodiment, for every CA/DC band combination, the UE indicates the DAPS-HO capability in a "DAPSHandover" parameter for each band combination entry.

Figure 4A:
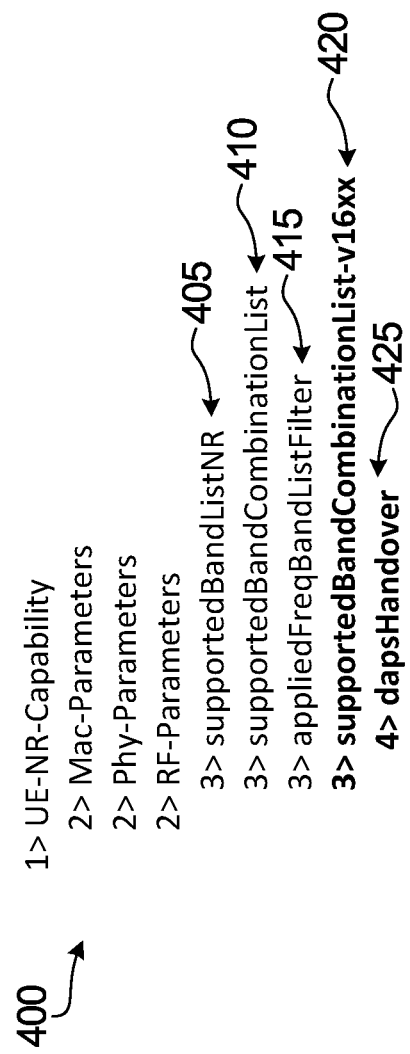
FIG. 4A illustrates a hierarchy of information in a UE NR capability message that would be sent by the UE to the network to indicate capabilities that the UE supports according to a first embodiment of the present disclosure.

FIG. 4A illustrates a hierarchy 400 of information of a UE NR capability message (UE-NR-Capability). Levels 1 and 2 are described above with reference to FIG. 3A. Level 3 includes parameter information for RF that indicates which bands are supported by the UE in a band list (supportedBandListNR) 405, which band combinations are supported in a band combination list (supportedBandCombinationList) 410, and an applied frequency band list filter (appliedFreqBandListFilter) 415. There is an additional band combination list identified as supported Band Combination Lists-v16xx 420 that is representative of additional capability parameters that may be added, which may include capability parameters introduced in the present disclosure. However, it is to be understood that this representation is merely for the sake of understanding and there may not be a particularly named supported Band Combination Lists-v16xx parameter. At Level 4 a dapsHandover parameter 425 is shown within the supported Band Combination Lists-v16xx parameter.

After initial access by the UE, the UE sends a capability message to the network. FIG. 4B illustrates an example of information 430 that may be included in the capability message from the UE in the RF parameter portion of the hierarchy shown in FIG. 4A.

A majority of the content of information 430 is similar to that of the content of information 330 in FIG. 3A. However, there is additional new content in information 430 that is not found in information 330, which is particular to aspects of the present disclosure. A BandCombinationLists-v16xx field 435 has been added following the BandCombinationList-v1560 field. A dapsHandover parameter field 440 is shown near the end of the content of information 430. Examples of parameters in the dapsHandover parameter field 440 will be described below.

Figure 5A:
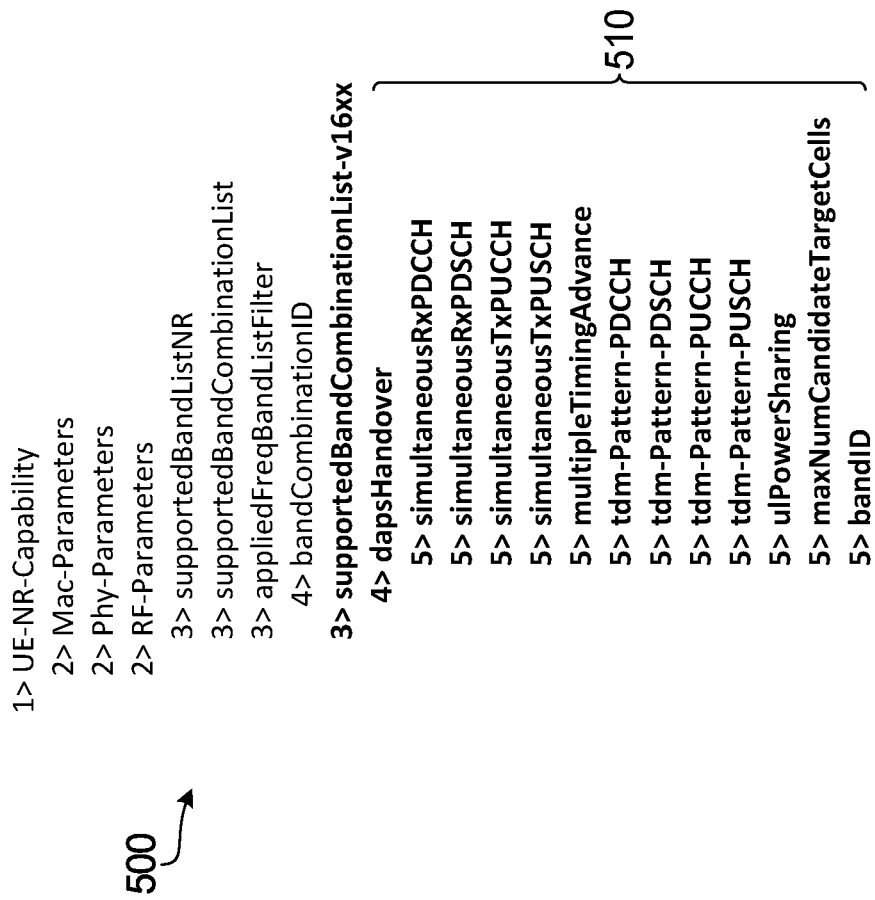
FIG. 5A illustrates a further detailed hierarchy of information in a UE NR capability message that would be sent by the UE to the network to indicate capabilities that the UE supports according to the first embodiment of the present disclosure shown in FIG. 4A.

FIG. 5A illustrates a hierarchy 500 of content of a UE NR capability message (UE-NR-Capability). Levels 1, 2, 3 and 4 are described above with reference to FIGS. 3A and 4A. Level 5 510 includes a list of parameters 510 that may be included in dapsHandover parameter field 440.

The list of parameters 510 in the intraFreqDapsHandover parameter includes, but is not limited to, the following parameters: simultaneousRxPDCCH, simultaneousRxPDSCH, simultaneousTxPUCCH, simultaneousTxPUSCH, maxNumCandidateTargetCells, multipleTimingAdvance, tdm-Pattern-PDCCH, tdm-Pattern-PDSCH, tdm-Pattern-PUCCH, tdm-Pattern-PUSCH, ulPowerSharing and bandID. All of the shown parameters or a subset of the parameters may be indicated by a UE that supports intra-frequency DAPS-HO at a given time. Intra-frequency DAPS-HO refers to a handover where the target cell was identified by the UE using so-called intra-frequency measurements, which are defined as measurements where the SS/PBCH blocks of the source and target cells are occupying the same center frequency and use the same subcarrier spacing. Correspondingly, inter-frequency DAPS-HO refers to a handover where the target cell was identified by the UE using so-called inter-frequency measurements. Inter-frequency measurements are measurements that are not intra-frequency measurements. It is also assumed that intra-frequency DAPS-HO operation is carried out when the source and target cells are both located on the same frequency band. There may be other parameters not listed in the example that may also be included, if appropriate.

The simultaneousRxPDCCH parameter indicates whether receiving PDCCH from the source and target base stations simultaneously during the handover is supported by the UE. The simultaneousRxPDSCH parameter indicates whether receiving PDSCH from the source and target base stations simultaneously during the handover is supported by the UE. The simultaneousTxPUCCH parameter indicates whether transmitting PUCCH to the source and target base stations simultaneously during the handover is supported by the UE. The simultaneousTxPUSCH parameter indicates whether transmitting PUSCH to the source and target base stations simultaneously during the handover is supported by the UE. The maxNumCandidateTargetCells parameter indicates a number of candidate target cells that the UE could be involved with as part of the DAPS-HO when determining the final target cell. The multipleTimingAdvance parameter indicates whether utilizing multiple timing advance for source and target base stations is supported during the handover. The tdm-Pattern-PDCCH parameter indicates whether time division multiplex (TDM) patterns for PDCCH are supported during the handover. The tdm-Pattern-PDSCH parameter indicates whether TDM patterns for PDSCH are supported during the handover. The tdm-Pattern-PUCCH parameter indicates whether TDM patterns for PUCCH are supported during the handover. The tdm-Pattern-PUSCH parameter indicates whether TDM patterns for PUSCH are supported during the handover. The ulPowerSharing parameter indicates whether dynamic and/or semi-static UL power sharing is supported during the handover. The bandID parameter provides an identification of one or more bands that are involved in the handover.

FIG. 5B illustrates an example of information 530 that may optionally be included in the capability message from the UE in the RF parameter portion of the hierarchy shown in FIG. 5A. Each listed parameter may be used to show whether a particular function is supported or not. An example might be a single bit, such as "1" to indicate supported and "0" to indicate not supported.

After the network receives UE capability information sent by the UE, the network sends an intra-frequency DAPS-HO command to the UE, The DAPS-HO command sent by the network provides the UE with a target cell configuration so that the UE can establish a link with the target cell. The signaling information to configure the link to the target cell is based on the one or more capability parameters the UE reported to the network.

If the UE indicates simultaneousRxPDCCH is supported, then upon reception of a intra-frequency DAPS-HO command from the network, the UE monitors PDCCH candidates for the target cell and the source cell in a same transmission resource, for example in the same slot. The PDCCH candidates that the UE monitors for the target cell are on the control resource sets (CORESETs) and Search Space sets that the network signaled in the DAPS-HO command. CORESETs are sets of physical resources and a set of parameters that are used to carry a PDCCH, which may include downlink control information (DCI). Search Space sets provide an indication of search space areas in the downlink resource where PDCCH may be carried.

FIG. 5C illustrates an example of information 540 that may optionally be included in the capability message from the UE as part of the simultanousRxPDCCH parameter field shown in FIG. 5B. Included in the simultanousRxPDCCH parameter field are a maximum number of CORESET across PDCCHs (which may be one of 6, 9, or 12), a maximum number of monitored PDCCH candidates in a source cell and/or a target cell (which may be one of 10, 11, 18, 22) and a maximum number of over-lapped control channel elements (CCEs) (which may be one of 16, 24, 28). The various parameters are identified, shown to be optional and when the parameter is used, can be enumerated to show an appropriate value, for example the example values included above.

If the UE indicates simultaneousTxPUCCH is supported, then upon reception of an intra-frequency DAPS-HO command from the network, the UE sends PUCCH transmissions towards the target cell and the source cell in a same transmission resource, for example the same slot. The PUCCH transmissions are sent on PUCCH resource groups and corresponding beam assumptions that the network signaled in the intra-frequency DAPS-HO command.

If the UE indicates multipleTimingAdvance is supported, then upon reception of an intra-frequency DAPS-HO command from the network, the UE sends a Random Access Channel Preamble (RACH Preamble) towards the target cell and acquires the Timing Advance with regard to the target cell and maintains Timing Advance values for multiple cells simultaneously, i.e. for the target cell and source cell.

If the UE indicates tdm-Pattern-PDCCH is supported, then upon reception of an intra-frequency DAPS-HO command from the network, the UE expects the source and target cell configurations to be configured such that DL/UL procedures take place in orthogonal slots. This means that the UE monitors PDCCH candidates from one cell in a given slot.

If the UE indicates tdm-Pattern-PDSCH is supported, then upon reception of an intra-frequency DAPS-HO command from the network, the UE expects the source and target cell configurations to be configured such that DL/UL procedures take place in orthogonal slots. This means that the UE receives PDSCH transmissions from one cell in a given slot.

If the UE indicates tdm-Pattern-PUCCH is supported, then upon reception of an intra-frequency DAPS-HO command from the network, the UE expects the source and target cell configurations to be configured such that DL/UL procedures take place in orthogonal slots. This means that the UE transmits PUCCH transmissions carrying hybrid automatic repeat request/channel state information/scheduling request (HARQ-ACK/CSI/SR) towards one cell in a given slot.

If the UE indicates tdm-Pattern-PUSCH is supported, then upon reception of an intra-frequency DAPS-HO command from the network, the UE expects the source and target cell configurations to be configured such that DL/UL procedures take place in orthogonal slots. This means that the UE transmits PUSCH transmissions towards one cell in a given slot.

The TDM patterns for any of the above situations may be based on one or more properties such as: UE identifier; slots in the time domain; quasi-co-location (QCL) assumptions; frequency-domain resources; code sequences; antenna ports.

FIG. 5D illustrates an example of information 550 that may optionally be included in the capability message from the UE as part of the tdm-Pattern-PUCCH parameter field shown in FIG. 5B. Included in the tdm-Pattern-PUCCH parameter field are, for a source cell and/or a target cell, supported PUCCH periodicities and an indication of whether PUCCH frequency hopping is supported. The various parameters are identified, shown to be optional and when the parameter is used, can be enumerated to show an appropriate value, for the case of PUCCH periodicities or simply whether the feature is supported, in the case of PUCCH frequency hopping.

If the UE indicates ulPowerSharing is supported with a particular type value, either semi-static value or dynamic value, then upon reception of an intra-frequency DAPS-HO command from the network, the UE shares the UE uplink transmission power between the source and target cells in either semi-static or dynamic fashion (as signaled by the network), correspondingly to what the network signaled in the intra-frequency DAPS-HO command.

Described below are further examples of operation of a UE and a network with regard to particular parameters that are indicated to be supported in a UE-NR-Capability message.

Simultaneous Reception of PDCCH

If a UE indicates in UE-NR-Capability a dapsHandover capability (for example indicated by reference character 425 in FIG. 4A) as part of a given band with simultaneousRxPDCCH, then the network may send a DAPS-HO command to the UE. For the duration of the DAPS-HO, the UE is expected to monitor per slot PDCCH candidates from each serving cell (i.e. both source and target cells).

In another example, if a UE indicates in UE-NR-Capability a dapsHandover capability as part of a given band identified as bandid (for example indicated in the group of parameters 510 in FIG. 5A), then the network may send a DAPS-HO command to the UE. For the duration of the DAPS-HO, the UE is expected to monitor per slot PDCCH candidates from each serving cell (i.e. both source and target cells).

In another example, if a UE indicates in UE-NR-Capability a dapsHandover capability as part of a given band combination identified as bandCombinationId, then the network may send a DAPS-HO command to the UE. For the duration of the DAPS-HO, the UE is expected to monitor per slot PDCCH candidates from each serving cell (i.e. both source and target cells).

The above embodiments may be used independently or in any combination, e.g. the UE indicating simultaneousRxPDCCH as part of a band combination identified as bandCombinationId. The above embodiments where the UE indicates DAPS-HO capability in a given band are applicable to cases where the source and target cells are in the same downlink bandwidth part (DL BWP) of a given carrier, in different DL BWPs of a given carrier, or in different carriers in the given band.

Simultaneous Reception of PDSCH

If a UE indicates in UE-NR-Capability a dapsHandover capability (for example indicated by reference character 425 in FIG. 4A) as part of a given band with simultaneousRxPDSCH, then the network may send a DAPS-HO command to the UE. For the duration of the DAPS-HO, the UE is expected to receive PDSCH transmissions scheduled by a corresponding PDCCH from each serving cell (i.e. both source and target cells).

In another example, if a UE indicates in UE-NR-Capability a dapsHandover capability as part of a given band identified as bandId (for example indicated in the group of parameters 510 in FIG. 5A), then the network may send a DAPS-HO command to the UE. For the duration of the DAPS-HO, the UE is expected to receive PDSCH transmissions scheduled by a corresponding PDCCH from each serving cell (i.e. both source and target cells).

In another example, if a UE indicates in UE-NR-Capability a dapsHandover capability as part of a given band combination identified as bandCombinationId, then the network may send a DAPS-HO command to the UE. For the duration of the DAPS-HO, the UE is expected to receive PDSCH transmissions scheduled by a corresponding PDCCH from each serving cell (i.e. both source and target cells).

The above embodiments may be used independently or in any combination, e.g. the UE indicating simultaneousRxPDSCH as part of a band combination identified as bandCombinationId. The above embodiments where the UE indicates DAPS-HO capability in a given band are applicable to cases where the source and target cells are in the same DL BWP of a given carrier, in different DL BWPs of a given carrier, or in different carriers in the given band.

Simultaneous Transmission of PUCCH

If a UE indicates in UE-NR-Capability a dapsHandover capability (for example indicated by reference character 425 in FIG. 4A) as part of a given band with simultaneousTxPUCCH, then the network may send a DAPS-HO command to the UE. For the duration of the DAPS-HO, the UE is expected to report uplink control informations (UCIs) in correspondence to received PDSCH transmissions scheduled by a respective PDCCH transmission for a given serving cell.

In another example, if a UE indicates in UE-NR-Capability a dapsHandover capability as part of a given band identified as bandId (for example indicated in the group of parameters 510 in FIG. 5A), then the network may send a DAPS-HO command to the UE. For the duration of the DAPS-HO, the UE is expected to report UCIs in correspondence to received PDSCH transmissions scheduled by a respective PDCCH transmission for a given serving cell.

In another example, if a UE indicates in UE-NR-Capability a dapsHandover capability as part of a given band combination identified as bandCombinationId, then the network may send a DAPS-HO command to the UE. For the duration of the DAPS-HO, the UE is expected to report UCIs in correspondence to received PDSCH transmissions scheduled by a respective PDCCH transmission for a given serving cell The above embodiments may be used independently or in any combination, e.g. the UE indicating simultaneousTxPUCCH as part of a band combination identified as bandCombinationId. The above embodiments where the UE indicates DAPS-HO capability in a given band are applicable to cases where the source and target cells are in the same DL BWP of a given carrier, in different DL BWPs of a given carrier, or in different carriers in the given band.

Simultaneous Transmission of PUSCH

If a UE indicates in UE-NR-Capability a dapsHandover capability (for example indicated by reference character 425 in FIG. 4A) with simultaneousTxPUSCH for a given band, then the network may send a DAPS-HO command to the UE. For the duration of the DAPS-HO, the UE is expected to transmit PUSCH transmissions scheduled by a corresponding PDCCH from each serving cell (i.e. both source and target cells).

In another example, if a UE indicates in UE-NR-Capability a dapsHandover capability for a given band identified as bandId (for example indicated in the group of parameters 510 in FIG. 5A), then the network may send a DAPS-HO command to the UE. For the duration of the DAPS-HO, the UE is expected to transmit PUSCH transmissions scheduled by a corresponding PDCCH from each serving cell (i.e. both source and target cells).

In another example, if a UE indicates in UE-NR-Capability a dapsHandover capability for a given band combination identified as bandCombinationId, then the network may send a DAPS-HO command to the UE. For the duration of the DAPS-HO, the UE is expected to receive PDSCH transmissions scheduled by a corresponding PDCCH from each serving cell (i.e. both source and target cells).

Number of candidate target cells for DAPS-HO

If a UE indicates in UE-NR-Capability a dapsHandover capability (for example indicated by reference character 425 in FIG. 4A) with maxNumCandidateTargetCells (for example indicated in the group of parameters 510 in FIG. 5A) for a given band, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band identified as bandId, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band identified as bandid, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band combination identified as bandCombinationId, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band combination identified as bandCombinationId, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells).

For the various examples described above, the serving cell may be a primary cell of a cell group and may correspond to the source cell or a candidate target cell indicated in the DAPS-HO command.

TDM pattern for PDCCH

If a UE indicates in UE-NR-Capability a dapsHandover capability (for example indicated by reference character 425 in FIG. 4A) with tdm-Pattern-PDCCH (for example indicated in the group of parameters 510 in FIG. 5A) for a given band, then the network may send a DAPS-HO command to the UE. For the duration of the DAPS-HO, the UE is expected to monitor per time-unit PDCCH candidates from a given serving cell (i.e. source or target cell).

In another example, if a UE indicates in UE-NR-Capability a dapsHandover capability with tdm-Pattern-PDCCH for a given band identified as bandId, then the network may send a DAPS-HO command to the UE. For the duration of the DAPS-HO, the UE is expected to monitor per time-unit PDCCH candidates from a given serving cell (i.e. source or target cell).

In another example, if a UE indicates in UE-NR-Capability a dapsHandover capability with tdm-Pattern-PDCCH for a given band combination identified as bandCombinationId, then the network may send a DAPS-HO command to the UE. For the duration of the DAPS-HO, the UE is expected to monitor per time-unit PDCCH candidates from a given serving cell (i.e. source or target cell).

When the UE is configured for DAPS-HO operation (i.e. when the UE receives a DAPS-HO command from the network) and the UE reported tdm-Pattern-PDCCH in UE-NR-Capability, the UE is not expected to be configured to monitor PDCCH candidates from more than one serving cell per time-unit.

TDM pattern for PDSCH

If a UE indicates in UE-NR-Capability a dapsHandover capability (for example indicated by reference character 425 in FIG. 4A) with tdm-Pattern-PDSCH (for example indicated in the group of parameters 510 in FIG. 5A) for a given band, then the network may send a DAPS-HO command to the UE. For the duration of the DAPS-HO, the UE is expected to receive per time-unit PDSCH transmissions scheduled by a corresponding PDCCH from a given serving cell (i.e. source or target cell).

In another example, if a UE indicates in UE-NR-Capability a dapsHandover capability with tdm-Pattern-PDSCH for a given band identified as bandId, then the network may send a DAPS-HO command to the UE. For the duration of the DAPS-HO, the UE is expected to receive per time-unit PDSCH transmissions scheduled by a corresponding PDCCH from a given serving cell (i.e. source or target cell).

In another example, if a UE indicates in UE-NR-Capability a dapsHandover capability with tdm-Pattern-PDSCH for a given band combination identified as bandCombinationId, then the network may send a DAPS-HO command to the UE. For the duration of the DAPS-HO, the UE is expected to receive per time-unit PDSCH transmissions scheduled by a corresponding PDCCH from a given serving cell (i.e. source or target cell).

When the UE is configured for DAPS-HO operation (i.e. when the UE receives a DAPS-HO command from the network) and the UE reported tdm-Pattern-PDSCH in UE-NR-Capability, the UE is not expected to be configured to receive PDSCH transmissions from more than one serving cell per time-unit.

TDM Pattern for PUCCH

If a UE indicates in UE-NR-Capability a dapsHandover capability (for example indicated by reference character 425 in FIG. 4A) with tdm-Pattern-PUCCH (for example indicated in the group of parameters 510 in FIG. 5A) for a given band, then the network may send a DAPS-HO command to the UE. For the duration of the DAPS-HO, the UE is expected to transmit PUCCH carrying UCIs for corresponding PDSCHs scheduled by a PDCCH by a serving cell (source or target) per time-unit In another example, if a UE indicates in UE-NR-Capability a dapsHandover capability with tdm-Pattern-PUCCH for a given band identified as bandId, then the network may send a DAPS-HO command to the UE. For the duration of the DAPS-HO, the UE is expected to transmit PUCCH carrying UCIs for corresponding PDSCHs scheduled by a PDCCH by a serving cell (source or target) per time-unit.

In another example, if a UE indicates in UE-NR-Capability a dapsHandover capability with tdm-Pattern-PUCCH for a given band combination identified as bandCombinationId, then the network may send a DAPS-HO command to the UE. For the duration of the DAPS-HO, the UE is expected to transmit PUCCH carrying UCIs for corresponding PDSCHs scheduled by a PDCCH by a serving cell (source or target) per time-unit.

When the UE is configured for DAPS-HO operation (i.e. when the UE receives a DAPS-HO command from the network) and the UE reported tdm-Pattern-PUCCH in UE-NR-Capability, the UE is not expected to be configured to transmit more than one PUCCH carrying UCIs for corresponding PDSCHs scheduled by a PDCCH by a serving cell (source or target) per time-unit.

TDM pattern for PUSCH

If a UE indicates in UE-NR-Capability a dapsHandover capability (for example indicated by reference character 425 in FIG. 4A) with tdm-Pattern-PUSCH (for example indicated in the group of parameters 510 in FIG. 5A) for a given band, then the network may send a DAPS-HO command to the UE. For the duration of the DAPS-HO, the UE is expected to transmit per time-unit PUSCH transmissions scheduled by a corresponding PDCCH from a given serving cell (i.e. source or target cell).

In another example, if a UE indicates in UE-NR-Capability a dapsHandover capability with tdm-Pattern-PUSCH for a given band identified as bandid, then the network may send a DAPS-HO command to the UE. For the duration of the DAPS-HO, the UE is expected to transmit per time-unit PUSCH transmissions scheduled by a corresponding PDCCH from a given serving cell (i.e. source or target cell).

In another example, if a UE indicates in UE-NR-Capability a dapsHandover capability with tdm-Pattern-PUSCH for a given band combination identified as bandCombinationId, then the network may send a DAPS-HO command to the UE. For the duration of the DAPS-HO, the UE is expected to transmit per time-unit PUSCH transmissions scheduled by a corresponding PDCCH from a given serving cell (i.e. source or target cell).

For the various examples described above, the serving cell may be a primary cell of a cell group and may correspond to the source cell or a candidate target cell indicated in the DAPS-HO command. The time-unit can be any one of: OFDM symbol, group of OFDM symbols; mini-slot; slot; group of slots.

When the UE is configured for DAPS-HO operation (i.e. when the UE receives a DAPS-HO command from the NW) and the UE reported tdm-Pattern-PUSCH in UE-NR-Capability, the UE is not expected to be configured to transmit PUSCH transmissions to more than one serving cell per time-unit.

In another embodiment, the UE sends the capability information or capability report to the network in a format that includes a DAPS-HO capability parameter. The DAPS-HO capability parameter includes the frequency band combinations that the UE supports for DAPS-HO. In this embodiment, the DAPS-HO capability is indicated in each corresponding CA/DC band combination entry in the BandCombinationList parameter.

Figure 6A:
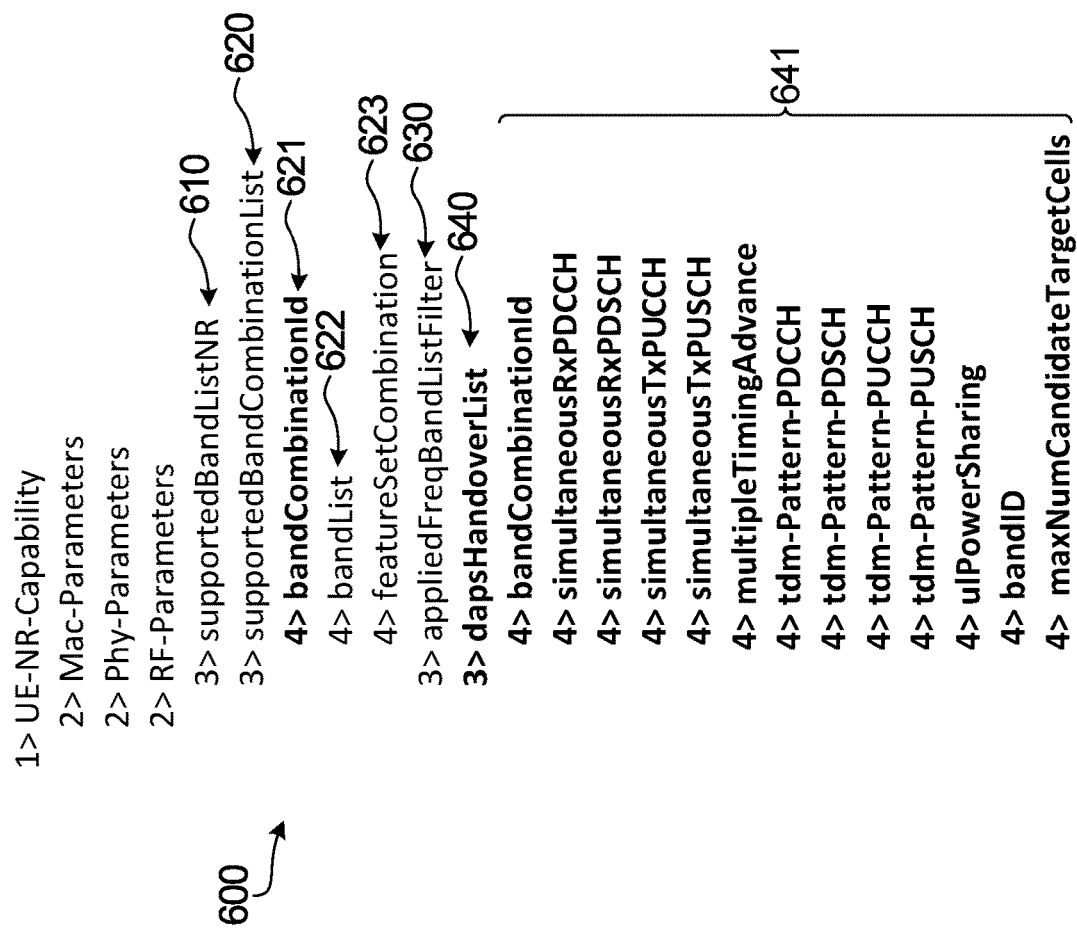
FIG. 6A illustrates a hierarchy of information in a UE NR capability message that would be sent by the UE to the network to indicate capabilities that the UE supports according to a second embodiment of the present disclosure.

FIG. 6A illustrates a hierarchy 600 of information of a UE NR capability message (UE-NR-Capability). Levels 1 and 2 are described above with reference to FIG. 3A. Level 3 includes parameter information for RF that indicates which bands are supported by the UE in a band list (supportedBandListNR) 610, which band combinations are supported in a band combination list (supportedBandCombinationList) 620, and an applied frequency band list filter (appliedFreqBandListFilter) 630. Several parameters are included at Level 4 that are associated with a supported band combination list 620. A band combination identifier parameter (bandCombinationId) 621 may be added as a new parameter, along with the band list (bandList) 622 and feature set combination (featureSetCombination) 623 parameters that are associated with band combination list 620 at Level 4. There is an additional DAPS handover list (dapsHandoverList) 640 in Level 3 that includes a set of DAPS handover specific parameters 641 each at Level 4.

Examples of the Level 4 DAPS handover specific parameters 641 include, but are not limited to: bandCombinationId, simultaneousRxPDCCH, simultaneousRxPDSCH, simultaneousTxPUCCH, simultaneousTxPUSCH, maxNumCanadidateTargetCells, multipleTimingAdvance, bandID, tdm-Pattern-PDCCH, tdm-Pattern-PDSCH, tdm-Pattern-PUCCH, tdm-Pattern-PUSCH, and ulPowerSharing.

The bandCombinationId parameter indicates an identifier for a given frequency band combination. The remainder of the parameters are the same as described in above embodiment, but may be implemented in a different manner.

FIG. 6B illustrates an example of information 650 that may optionally be included in the capability message from the UE in the RF parameter portion of the hierarchy shown in FIG. 6A. Each listed parameter may be used to show a particular parameter name, possible values for the parameter, or whether a particular function is supported or not. An example of a value to show if a function is supported or not might be a single bit, such as "1" to indicate supported and "0" to indicate not supported.

A majority of the content of information 650 is similar to that of the content of information 330 in FIG. 3A. However, there is additional new content in information 650 that is not found in information 330, which is particular to aspect of the present disclosure. A DAPSHandoverList field 660 has been added below the BandCombinationList-v1560 field. The DAPSHandover section 680 has been added near the end of the information 650 including multiple DAPS handover specific parameters.

After the network receives UE capability information sent by the UE, the network sends a DAPS-HO command to the UE, The DAPS-HO command sent by the network provides the UE with a target cell configuration so that the UE can establish a link with the target cell. The signaling information to configure the link to the target cell is based on the one or more capability parameters the UE reported to the network.

If the UE indicates simultaneousRxPDCCH is supported, then upon reception of a DAPS-HO command from the network, the UE monitors PDCCH candidates for the target cell and the source cell in a same transmission resource, for example in the same slot. The PDCCH candidates that the UE monitors for the target cell are on the CORESETs and Search Space sets that the network signaled in the DAPS-HO command.

If the UE indicates simultaneousTxPUCCH is supported, then upon reception of a DAPS-HO command from the network, the UE sends PUCCH transmissions towards the target cell and the source cell in a same transmission resource, for example the same slot. The PUCCH transmissions are sent on PUCCH resource groups and corresponding beam assumptions that the network signaled in the DAPS-HO command.

If the UE indicates multipleTimingAdvance is supported, then upon reception of a DAPS-HO command from the network, the UE sends a RACH Preamble towards the target cell and acquires the Timing Advance with regard to the target cell and maintains Timing Advance values for multiple cells simultaneously, i.e. for the target cell and the source cell.

If the UE indicates tdm-Pattern-PDCCH is supported, then upon reception of a DAPS-HO command from the network, the UE is not expected to be configured to monitor PDCCH candidates from more than one serving cell per given time-unit.

If the UE indicates tdm-Pattern-PDSCH is supported, then upon reception of a DAPS-HO command from the network, the UE is not expected to receive PDSCH transmissions scheduled by a corresponding PDCCH transmission from more than one serving cell per given time-unit.

If the UE indicates tdm-Pattern-PUCCH is supported, then upon reception of a DAPS-HO command from the network, the UE is not expected to be configured to transmit more than one PUCCH carrying UCIs for corresponding PDSCHs scheduled by a PDCCH by a serving cell (source or target) per time-unit.

If the UE indicates tdm-Pattern-PUSCH is supported, then upon reception of a DAPS-HO command from the network, the UE is not expected to transmit PUSCH transmissions scheduled by a corresponding PDCCH transmission from more than one serving cell per give time-unit.

The TDM patterns for any of the above situations may be based on one or more properties such as: UE identifier; slots in the time domain; QCL assumptions; frequency-domain resources; code sequences; antenna ports.

If the UE indicates uplinkPowerSharing is supported with a particular type value, either semi-static value or dynamic value, then upon reception of a DAPS-HO command from the network, the UE shares the UE uplink transmission power between the source and target cells in either semi-static or dynamic fashion (as signaled by the network), correspondingly to what the network signaled in the DAPS-HO command.

Described below are further examples of operation of a UE and a network with regard to particular parameters that are indicated to be supported in a UE-NR-Capability message.

Simultaneous Reception of PDCCH

If a UE indicates in UE-NR-Capability a dapsHandover capability with simultaneousRxPDCCH (for example indicated in the group of parameters 641 in FIG. 6A) for a given band, then the network may send a DAPS-HO command to the UE. For the duration of the DAPS-HO, the UE is expected to monitor per slot PDCCH candidates from each serving cell (i.e. both source and target cells).

In another example, if a UE indicates in UE-NR-Capability a dapsHandover capability for a given band identified by bandId (for example indicated in the group of parameters 641 in FIG. 6A), then the network may send a DAPS-HO command to the UE. For the duration of the DAPS-HO, the UE is expected to monitor per slot PDCCH candidates from each serving cell (i.e. both source and target cells).

In another example, if a UE indicates in UE-NR-Capability a dapsHandover capability for a given band combination identified by bandCombinationId (for example indicated in the group of parameters 641 in FIG. 6A), then the network may send a DAPS-HO command to the UE. For the duration of the DAPS-HO, the UE is expected to monitor per slot PDCCH candidates from each serving cell (i.e. both source and target cells).

The above embodiments may be used independently or in any combination, e.g. the UE indicating simultaneousRxPDCCH for a band combination identified by bandCombinationId. The above embodiments where the UE indicates DAPS-HO capability in a given band are applicable to cases where the source and target cells are in the same DL BWP of a given carrier, in different DL BWPs of a given carrier, or in different carriers in the given band.

Simultaneous Reception of PDSCH

If a UE indicates in UE-NR-Capability a dapsHandover capability with simultaneousRxPDSCH for a given band, then the network may send a DAPS-HO command to the UE. For the duration of the DAPS-HO, the UE is expected to receive PDSCH transmissions scheduled by a corresponding PDCCH from each serving cell (i.e. both source and target cells).

In another example, if a UE indicates in UE-NR-Capability a dapsHandover capability for a given band identified by bandId, then the network may send a DAPS-HO command to the UE. For the duration of the DAPS-HO, the UE is expected to receive PDSCH transmissions scheduled by a corresponding PDCCH from each serving cell (i.e. both source and target cells).

In another example, if a UE indicates in UE-NR-Capability a dapsHandover capability for a given band combination identified by bandCombinationId, then the network may send a DAPS-HO command to the UE. For the duration of the DAPS-HO, the UE is expected to receive PDSCH transmissions scheduled by a corresponding PDCCH from each serving cell (i.e. both source and target cells).

The above embodiments may be used independently or in any combination, e.g. the UE indicating simultaneousRxPDSCH as part of a band combination identified as bandCombinationId. The above embodiments where the UE indicates DAPS-HO capability in a given band are applicable to cases where the source and target cells are in the same DL BWP of a given carrier, in different DL BWPs of a given carrier, or in different carriers in the given band.

Simultaneous Transmission of PUCCH

If a UE indicates in UE-NR-Capability a dapsHandover capability with simultaneousTxPUCCH for a given band, then the network may send a DAPS-HO command to the UE. For the duration of the DAPS-HO, the UE is expected to report UCIs in correspondence to received PDSCH transmissions scheduled by a respective PDCCH transmission for a given serving cell.

In another example, if a UE indicates in UE-NR-Capability a dapsHandover capability for a given band identified by bandId, then the network may send a DAPS-HO command to the UE. For the duration of the DAPS-HO the UE is expected to report UCIs in correspondence to received PDSCH transmissions scheduled by a respective PDCCH transmission for a given serving cell.

In another example, if a UE indicates in UE-NR-Capability a dapsHandover capability for a given band combination identified by bandCombinationId, then the network may send a DAPS-HO command to the UE. For the duration of the DAPS-HO, the UE is expected to report UCIs in correspondence to received PDSCH transmissions scheduled by a respective PDCCH transmission for a given serving cell.

The above embodiments may be used independently or in any combination, e.g. the UE indicating simultaneousTx-PUCCH for a band combination identified by bandCombinationId. The above embodiments where the UE indicates DAPS-HO capability in a given band are applicable to cases where the source and target cells are in the same DL BWP of a given carrier, in different DL BWPs of a given carrier, or in different carriers in the given band.

Simultaneous Transmission of PUSCH

If a UE indicates in UE-NR-Capability a dapsHandover capability with simultaneousTxPUSCH for a given band, then the network may send a DAPS-HO command to the UE. For the duration of the DAPS-HO, the UE is expected to transmit PUSCH transmissions scheduled by a corresponding PDCCH from each serving cell (i.e. both source and target cells).

In another example, if a UE indicates in UE-NR-Capability a dapsHandover capability for a given band identified by bandId, then the network may send a DAPS-HO command to the UE. For the duration of the DAPS-HO, the UE is expected to transmit PUSCH transmissions scheduled by a corresponding PDCCH from each serving cell (i.e. both source and target cells).

In another example, if a UE indicates in UE-NR-Capability a dapsHandover capability for a given band combination identified by bandCombinationId, then the network may send a DAPS-HO command to the UE. For the duration of the DAPS-HO, the UE is expected to receive PDSCH transmissions scheduled by a corresponding PDCCH from each serving cell (i.e. both source and target cells).

The above embodiments may be used independently or in any combination, e.g. the UE indicating simultaneousTx-PUSCH for a band combination identified by bandCombinationId. The above embodiments where the UE indicates DAPS-HO capability in a given band are applicable to cases where the source and target cells are in the same DL BWP of a given carrier, in different DL BWPs of a given carrier, or in different carriers in the given band.

Number of candidate target cells for DAPS-HO

If a UE indicates in UE-NR-Capability a dapsHandover capability with maxNumCandidateTargetCells (for example indicated in the group of parameters 641 in FIG. 6A) for a given band, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band identified by bandid, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band identified by bandid, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band combination identified by bandCombinationId, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a dapsHandover capability with maxNumCandidateTargetCells for a given band combination identified by bandCombinationId, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells).

For the various examples described above, the serving cell may be a primary cell of a cell group and may correspond to the source cell or a candidate target cell indicated in the DAPS-HO command.

In another embodiment, the UE sends the capability information or capability report to the network in a format that includes a DAPS-HO capability parameter. The DAPS-HO capability parameter includes the band combinations that the UE supports for DAPS-HO. The DAPS-HO capability in this embodiment is indicated in the DL/UL feature set of each reported CA/DC combination.

Figure 7A:
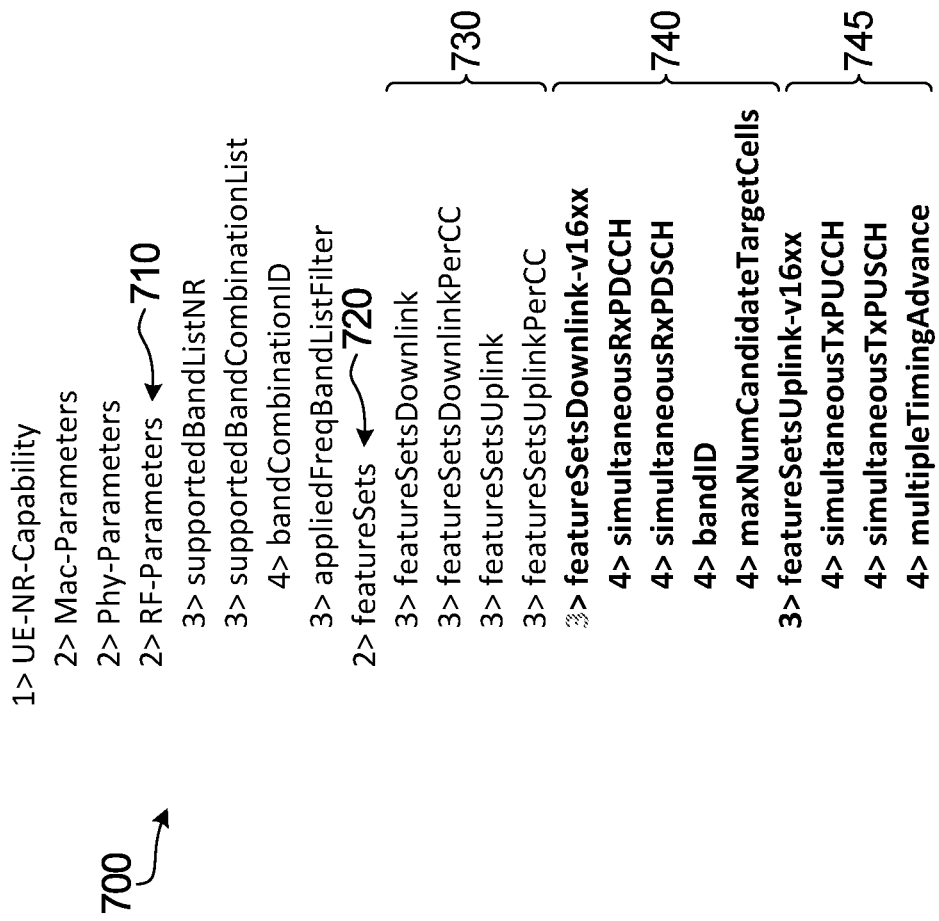
FIG. 7A illustrates a hierarchy of information in a UE NR capability message that would be sent by the UE to the network to indicate capabilities that the UE supports according to a third embodiment of the present disclosure.

FIG. 7A illustrates a hierarchy 700 of information of a UE NR capability message (UE-NR-Capability). Levels 1 and 2 are described above with reference to FIG. 3A, however there is also a new additional Level 2 parameter identified as featureSets 720. Existing Level 3 parameters within this Level 2 parameter include featureSetsDownlink, featureSetsDownlinkPerCC, featureSetsUplink and feature SetsUplinkPerCC. These parameters may include additional information regarding particular features that are supported by the UE. New Level 3 parameters in the featureSets 720 portion include featureSetsDownlink-v16xx 740 and featureSetsUplinkparameter-v16xx 745. The featureSetsDownlink-v16xx 740 and featureSetsUplinkparameter-v16xx 745 are representative of additional capability parameters. However, it is to be understood that this representation is merely for the sake of understanding and there may not be a particularly named featureSetsDownlink-v16xx and featureSetsUplinkparameter-v16xx.

The featureSetsDownlink-v16xx 740 parameter may include additional parameters such as simultaneousRxPDCCH and simultaneousRxPDSCH. The featureSetsUplink-v16xx 745 parameter may include additional parameters such as simultaneousTxPUCCH, simultaneousTxPUSCH and multipleTimingAdvance. These parameters made include similar information as described above with regard to FIGS. 4B, 5B, 6B, and the more detailed description of the examples in FIGS. 5C and 5D.

FIG. 7B illustrates an example of information 750 that may optionally be included in the capability message from the UE in the featureSetsDownlink-v16xx 740 portion of the hierarchy shown in FIG. 7A. Each listed parameter may be used to show a particular parameter name, possible values for the parameter, or whether a particular function is supported or not. An example of a value to show if a function is supported or not might be a single bit, such as "1" to indicate supported and "0" to indicate not supported.

Examples of the parameters in featureSetsDownlink-v16xx 740 include, but are not limited to: simultaneousRxPDCCH, simultaneousRxPDSCH, simultaneousTxPUCCH, simultaneousTxPUSCH, multipleTimingAdvance, tdm-Pattern-PDCCH, and tdm-Pattern-PDSCH.

The parameters have the same meanings as described above for Embodiments 1 and 2, but may be implemented in a different manner.

After the network receives UE capability information sent by the UE, the network sends a DAPS-HO command to the UE, The DAPS-HO command sent by the network provides the UE with a target cell configuration so that the UE can establish a link with the target cell. The signaling information to configure the link to the target cell is based on the one or more capability parameters the UE reported to the network.

If the UE indicates simultaneousRxPDCCH is supported, then upon reception of a DAPS-HO command from the network, the UE monitors PDCCH candidates for the target cell and the source cell in a same transmission resource, for example in the same slot. The PDCCH candidates that the UE monitors for the target cell are on the CORESETs and Search Space sets that the network signaled in the DAPS-HO command.

If the UE indicates simultaneousTxPUCCH is supported, then upon reception of a DAPS-HO command from the network, the UE sends PUCCH transmissions towards the target cell and the source cell in a same transmission resource, for example the same slot. The PUCCH transmissions are sent on PUCCH resource groups and corresponding beam assumptions that the network signaled in the DAPS-HO command.

If the UE indicates multipleTimingAdvance is supported, then upon reception of a DAPS-HO command from the network, the UE sends a Random Access Preamble (RACH Preamble) towards the target cell and acquire Timing Advance towards the target cell and maintains Timing Advance values for multiple cells simultaneously.

Simultaneous Reception of PDCCH

If a UE indicates in UE-NR-Capability a featureSetsDownlink capability (for example indicated by reference character 740 in FIG. 7A) with simultaneousRxPDCCH for a given band, then the network may send a DAPS-HO command to the UE. For the duration of the DAPS-HO, the UE is expected to monitor per slot PDCCH candidates from each serving cell (i.e. both source and target cells).

In another example, if a UE indicates in UE-NR-Capability a featureSetsDownlink capability with simultaneousRxPDCCH for a given band combination, then the network may send a DAPS-HO command to the UE. For the duration of the DAPS-HO, the UE is expected to monitor per slot PDCCH candidates from each serving cell (i.e. both source and target cells).

Simultaneous Reception of PDSCH

If a UE indicates in UE-NR-Capability a featureSetsDownlink capability with simultaneousRxPDSCH for a given band, then the network may send a DAPS-HO command to the UE. For the duration of the DAPS-HO, the UE is expected to receive PDSCH transmissions scheduled by a corresponding PDCCH from each serving cell (i.e. both source and target cells).

In another example, if a UE indicates in UE-NR-Capability a featureSetsDownlink capability with simultaneousRxPDSCH for a given band combination, then the network may send a DAPS-HO command to the UE. For the duration of the DAPS-HO, the UE is expected to receive PDSCH transmissions scheduled by a corresponding PDCCH from each serving cell (i.e. both source and target cells).

Simultaneous Transmission of PUCCH

If a UE indicates in UE-NR-Capability a featureSetsUplink capability (for example indicated by reference character 745 in FIG. 7A) with simultaneousTxPUCCH for a given band, then the network may send a DAPS-HO command to the UE. For the duration of the DAPS-HO, the UE is expected to report UCIs in correspondence to received PDSCH transmissions scheduled by a respective PDCCH transmission for a given serving cell.

In another example, if a UE indicates in UE-NR-Capability a featureSetsUplink capability with simultaneousTxPUCCH for a given band combination, then the network may send a DAPS-HO command to the UE. For the duration of the DAPS-HO, the UE is expected to report UCIs in correspondence to received PDSCH transmissions scheduled by a respective PDCCH transmission for a given serving cell.

Simultaneous Transmission of PUSCH

If a UE indicates in UE-NR-Capability a featureSetsUplink capability with simultaneousTxPUSCH for a given band, then the network may send a DAPS-HO command to the UE. For the duration of the DAPS-HO, the UE is expected to transmit PUSCH transmissions scheduled by a corresponding PDCCH from each serving cell (i.e. both source and target cells).

In another example, if a UE indicates in UE-NR-Capability a featureSetsUplink capability with simultaneousTxPUSCH for a given band combination, then the network may send a DAPS-HO command to the UE. For the duration of the DAPS-HO, the UE is expected to transmit PUSCH transmissions scheduled by a corresponding PDCCH from each serving cell (i.e. both source and target cells).

Number of candidate target cells for DAPS-HO

If a UE indicates in UE-NR-Capability a featureSetsDownlink capability with maxNumCandidateTargetCells (for example indicated by reference character 740 in FIG. 7A) for a given band, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a featureSetsDownlink capability with maxNumCandidateTargetCells for a given band, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells).

In another example, if a UE indicates in UE-NR-Capability a featureSetsDownlink capability with maxNumCandidateTargetCells for a given band identified as bandid, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a featureSetsDownlink capability with maxNumCandidateTargetCells for a given band identified as bandid, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells).

In another example, if a UE indicates in UE-NR-Capability a featureSetsDownlink capability with maxNumCandidateTargetCells for a given band combination identified as bandCombinationId, then the network may send up to maxNumCandidateTargetCells DAPS-HO commands to the UE. For the duration of each DAPS-HO with a given target cell, the UE is expected to monitor per slot PDCCH candidates from each serving cell (i.e. both source and the given target cells).

In another example, if a UE indicates in UE-NR-Capability a featureSetsDownlink capability with maxNumCandidateTargetCells for a given band combination identified as bandCombinationId, then the network may send a DAPS-HO command carrying up to maxNumCandidateTargetCells target cell configurations to the UE. For the duration of each DAPS-HO with a given target cell, the UE is expected to monitor per slot PDCCH candidates from each serving cell (i.e. both source and the given target cells)

Included below are several additional examples of UE behavior under simultaneous connectivity handover related to UE capability that are applicable to any or Embodiments 1, 2 and 3.

In the following embodiments, embodiments of UE behavior are provided where the UE indicates a capability C that may not be included as part of dapsHandover or a given band or a given band combination. However, when the UE is configured for DAPS-HO operation, this capability C may still influence the UE's behavior during DAPS-HO.

Simultaneous Reception of PDCCH

When the UE is configured for DAPS-HO operation (i.e. when the UE receives a DAPS-HO command from the network), the UE may indicate respective maximum values for the number of CORESETs for source and target cells through a maxNumCORESETs parameter. If the UE reports maxNumCORESETs for a given cell (i.e. source or target) in UE-NR-Capability, the UE does not expect to be configured with a number of CORESETs that is larger than maxNumCORESETs per given cell. The UE monitors a number PDCCH candidates per slot in up to maxNumCORESETs CORESETs for a given cell (i.e. source or target).

When the UE is configured for DAPS-HO operation (i.e. when the UE receives a DAPS-HO command from the network), the UE may indicate respective maximum values for the number of search space sets for source and target cells through a maxNumSearchSpaceSets parameter. If the UE reports maxNumSearchSpaceSets for a given cell (i.e. source or target) in UE-NR-Capability, the UE does not expect to be configured with a number of Search Space sets that is larger than maxNumSearchSpaceSets per given cell. The UE monitors a number PDCCH candidates per slot in up to maxNumSearchSpaceSets search space sets for a given cell (i.e. source or target).

When the UE is configured for DAPS-HO operation (i.e. when the UE receives a DAPS-HO command from the network), the UE may indicate respective maximum values for the number of PDCCH candidates for source and target cells through a maxNumPDCCHCandidates parameter. If the UE reports maxNumPDCCHCandidates for a given cell (i.e. source or target) in UE-NR-Capability, the UE does not expect to monitor per slot a number of PDCCH candidates that is larger than maxNumPDCCHCandidates per given cell. The UE monitors up to maxNumPDCCHCandidates PDCCH candidates per slot in a given number of CORESETs and Search Space sets for a given cell (i.e. source or target).

When the UE is configured for DAPS-HO operation (i.e. when the UE receives a DAPS-HO command from the network), the UE may indicate respective maximum values for the number of non-overlapped CCEs for PDCCH candidates in source and target cells through a maxNumNonOverlappedCCEs parameter. If the UE reports maxNumNonOverlappedCCEs for a given cell (i.e. source or target) in UE-NR-Capability, the UE does not expect to be provided a number of non-overlapped CCEs to monitor corresponding PDCCH candidates on that is larger than maxNumNonOverlappedCCEs per given cell. The UE monitors a number of PDCCH candidates per slot in up to maxNumNonOverlappedCCEs CCEs for a given cell (i.e. source or target).

The above embodiments may be used independently or in any combination, e.g. the UE indicating maximum values for CORESETs and number of PDCCH candidates. The above embodiments where the UE indicates DAPS-HO capability in a given band are applicable to cases where the source and target cells are in the same DL BWP of a given carrier, in different DL BWPs of a given carrier, or in different carriers in the given band.

The above embodiments are also applicable to maximum values that are given for all serving cells, i.e. source and candidate target cells. For instance: the UE can indicate maxNumCORESETs in UE-NR-Capability that can be used across source and target cells combined.

The above embodiments may describe UE capabilities that are supported for multiple purposes and not just DAPS-HO, e.g. multi-transmit receive point (TRP) transmission, ultra-reliable low-latency communication (URLLC), multiple input multiple output (MIMO), vehicle to anything (V2X), New Radio-Unlicensed (NR-U), New Radio-Dual Connectivity (NR-DC), and New Radio-Carrier Aggregation (NR-CA). In some embodiments, the capabilities may be notified to the network for the other purposes indicated above in a similar manner to that described above for DAPS-HO Simultaneous transmission of PDSCH When the UE is configured for DAPS-HO operation (i.e. when the UE receives a DAPS-HO command from the network), the UE may indicate respective maximum values for the number of codewords for source and target cells through a maxNumCodewords parameter. If the UE reports maxNumCodewords for a given cell (i.e. source or target) in UE-NR-Capability, the UE does not expect to receive DCI formats scheduling more than maxNumCodewords per given cell. The UE receives a number of codewords per slot that is up to maxNumCodewords for a given cell (i.e. source or target).

When the UE is configured for DAPS-HO operation (i.e. when the UE receives a DAPS-HO command from the network), the UE may indicate respective maximum values for the number of layers for source and target cells through a maxNumLayers parameter. If the UE reports maxNum- Layers for a given cell (i.e. source or target) in UE-NR-Capability, the UE does not expect to receive DCI formats scheduling codewords over a number of layers higher than maxNumLayers per given cell. The UE receives a number of codewords per slot that is up to maxNumLayers for a given cell (i.e. source or target).

When the UE is configured for DAPS-HO operation (i.e. when the UE receives a DAPS-HO command from the network), the UE may indicate respective maximum values for the number of layers per codeword for source and target cells through a maxNumLayersPerCodeword parameter. If the UE reports maxNumLayersPerCodeword for a given cell (i.e. source or target) in UE-NR-Capability, the UE does not expect to receive DCI formats scheduling codewords with a number of layers higher than maxNumLayersPerCodeword per given cell and per given codeword. The UE receives a number of layers per codeword per slot that is up to maxNumLayersPerCodeword for a given cell (i.e. source or target).

When the UE is configured for DAPS-HO operation (i.e. when the UE receives a DAPS-HO command from the network), the UE may indicate respective maximum values for the number of active transmission configuration indicator (TCI) states for PDSCH transmissions for source and target cells through a maxNumActiveTCIStates parameter. If the UE reports maxNumActiveTCIStates for a given cell (i.e. source or target) in UE-NR-Capability, the UE does not expect to receive DCI formats scheduling codewords with a number of active TCI states that is larger than maxNumActiveTCIStates per given cell. The UE receives a number of active TCI states per PDSCH transmission per slot that is up to maxNumActiveTCIStates for a given cell (i.e. source or target).

When the UE is configured for DAPS-HO operation (i.e. when the UE receives a DAPS-HO command from the network), the UE may indicate respective maximum values for the number of PRBs for the active DL BWP for source and target cells through a maxNumPRBs parameter. If the UE reports maxNumPRBs for a given cell (i.e. source or target) in UE-NR-Capability, the UE does not expect to receive DCI formats scheduling codewords with a number of PRBs larger than maxNumPRBs per given cell. The UE receives a number of codewords per slot that is up to maxNumPRBs PRBs for a given cell (i.e. source or target).

The above embodiments may be used independently or in any combination, e.g. the UE indicating maximum values for codewords and layers. The above embodiments where the UE indicates DAPS-HO capability in a given band are applicable to cases where the source and target cells are in the same DL BWP of a given carrier, in different DL BWPs of a given carrier, or in different carriers in the given band.

The above embodiments are also applicable to maximum values that are given for all serving cells, i.e. source and candidate target cells. For instance: the UE can indicate maxNumCodewords in UE-NR-Capability that can be used across source and target cells combined.

The above embodiments may use UE capabilities that are used for multiple purposes and not just DAPS-HO.
Simultaneous transmission of PUCCH When the UE is configured for DAPS-HO operation (i.e. when the UE receives a DAPS-HO command from the network), the UE may indicate respective maximum values for the number of PUCCH resource sets for source and target cells through a maxNumPUCCHResourceSets parameter. If the UE reports maxNumPUCCHResourceSets for a given cell (i.e. source or target) in UE-NR-Capability, the UE does not expect to be configured with a number of PUCCH resource sets that is larger than maxNumPUCCHResourceSets per given cell.

When the UE is configured for DAPS-HO operation (i.e. when the UE receives a DAPS-HO command from the network), the UE may indicate respective maximum values for the number of PUCCH spatial relationships for source and target cells through a maxNumPUCCHSpatialRelations parameter. If the UE reports maxNumPUCCHSpatialRelations for a given cell (i.e. source or target) in UE-NR-Capability, the UE does not expect to be configured with a number of PUCCH spatial relationships larger than maxNumPUCCHSpatialRelations per given cell.

When the UE is configured for DAPS-HO operation (i.e. when the UE receives a DAPS-HO command from the network), the UE may indicate maximum values for UCI payload for source and target cells respectively through a maxUCIPayloadSize parameter. If the UE reports maxUCIPayloadSize for a given cell (i.e. source or target) in UE-NR-Capability, the UE will transmit PUCCH carrying UCIs with a payload of up to maxUCIPayloadSize.

When the UE is configured for DAPS-HO operation (i.e. when the UE receives a DAPS-HO command from the network), the UE may indicate respective maximum values for the number of PDSCH transmissions the UE can use to combine to generate a UCI carrying HARQ-ACK bits for the respective PDSCH transmissions for source and target cells respectively through a maxNumPDSCHstoCombine parameter. If the UE reports maxNumPDSCHstoCombine for a given cell (i.e. source or target) in UE-NR-Capability, the UE is not required to combine HARQ-ACK bits for more than maxNumPDSCHstoCombine PDSCH transmissions per given cell in a given UCI.

When the UE is configured for DAPS-HO operation (i.e. when the UE receives a DAPS-HO command from the network), the UE may indicate a value in a {dynamic; semiStatic} field for uplinkPowerSharing support towards source and target cells. If the UE reports uplinkPowerSharing in UE-NR-Capability, the UE will transmit PUCCH carrying UCIs towards source and target cells in accordance to the value reported in uplinkPowerSharing.

When the UE is configured for DAPS-HO operation (i.e. when the UE receives a DAPS-HO command from the network), the UE may indicate a value in a {supported} field for multipleTimingAdvance for source and target cells. If the UE reports multipleTimingAdvance in UE-NR-Capability, the UE will transmit PUCCH carrying UCIs towards source and target cells using respective Timing Advance values.

The above embodiments may be used independently or in any combination, e.g. the UE indicating maximum values for PUCCH resource sets and maximum values for UCI payload. The above embodiments where the UE indicates DAPS-HO capability in a given band are applicable to cases where the source and target cells are in the same DL BWP of a given carrier, in different DL BWPs of a given carrier, or in different carriers in the given band.

The above embodiments are also applicable with maximum values that are given for all serving cells, i.e. source and candidate target cells. For instance: the UE can indicate maxNumPUCCHResourceSets in UE-NR-Capability that can be used across source and target cells combined.

The above embodiments may use UE capabilities that are used for multiple purposes and not just DAPS-HO.
Simultaneous transmission of PUSCH When the UE is configured for DAPS-HO operation (i.e. when the UE receives a DAPS-HO command from the network), the UE may indicate respective maximum values for the number of codewords for source and target cells through a maxNumCodewords parameter. If the UE reports maxNumCodewords for a given cell (i.e. source or target) in UE-NR-Capability, the UE does not expect to receive DCI formats scheduling more than maxNumCodewords per given cell. The UE receives a number of codewords per slot that is up to maxNumCodewords for a given cell (i.e. source or target).

When the UE is configured for DAPS-HO operation (i.e. when the UE receives a DAPS-HO command from the network), the UE may indicate respective maximum values for the number of layers for source and target cells through a maxNumLayers parameter. If the UE reports maxNumLayers for a given cell (i.e. source or target) in UE-NR-Capability, the UE does not expect to receive DCI formats scheduling codewords over a number of layers higher than maxNumLayers per given cell. The UE receives a number of codewords per slot that is up to maxNumLayers for a given cell (i.e. source or target).

When the UE is configured for DAPS-HO operation (i.e. when the UE receives a DAPS-HO command from the network), the UE may indicate respective maximum values for the number of layers per codeword for source and target cells through a maxNumLayersPerCodeword parameter. If the UE reports maxNumLayersPerCodeword for a given cell (i.e. source or target) in UE-NR-Capability, the UE does not expect to receive DCI formats scheduling codewords with a number of layers higher than maxNumLayersPerCodeword per given cell and per given codeword. The UE receives a number of layers per codeword per slot that is up to maxNumLayersPerCodeword for a given cell (i.e. source or target).

When the UE is configured for DAPS-HO operation (i.e. when the UE receives a DAPS-HO command from the network), the UE may indicate respective maximum values for the number of active TCI states for PDSCH transmissions for source and target cells through a maxNumActiveTCIStates parameter. If the UE reports maxNumActiveTCIStates for a given cell (i.e. source or target) in UE-NR-Capability, the UE does not expect to receive DCI formats scheduling codewords with a number of active TCI states that is larger than maxNumActiveTCIStates per given cell. The UE receives a number of active TCI states per PDSCH transmission per slot that is up to maxNumActiveTCIStates for a given cell (i.e. source or target).

When the UE is configured for DAPS-HO operation (i.e. when the UE receives a DAPS-HO command from the network), the UE may indicate respective maximum values for the number of PRBs for the active DL BWP for source and target cells through a maxNumPRBs parameter. If the UE reports maxNumPRBs for a given cell (i.e. source or target) in UE-NR-Capability, the UE does not expect to receive DCI formats scheduling codewords with a number of PRBs larger than maxNumPRBs per given cell. The UE receives a number of codewords per slot that is up to maxNumPRBs PRBs for a given cell (i.e. source or target).

The above embodiments may be used independently or in any combination, e.g. the UE indicating maximum values for codewords and layers. The above embodiments where the UE indicates DAPS-HO capability in a given band are applicable to cases where the source and target cells are in the same DL BWP of a given carrier, in different DL BWPs of a given carrier, or in different carriers in the given band.

The above embodiments are also applicable with maximum values that are given for all serving cells, i.e. source and candidate target cells. For instance: the UE can indicate maxNumCodewords in UE-NR-Capability that can be used across source and target cells combined.

The above embodiments may use UE capabilities that are used for multiple purposes and not just DAPS-HO.

The following portion of the description describes processes on the network side after the network has received the DAPS-HO capability information from the UE.

In some embodiments, the network sends a DAPS-HO command to the UE and provides the UE with the target cell configuration so that the UE can establish a link with the target cell. In order to deal with situations which may be beyond what the UE is capable of, there may be priority rules defined in order to help the UE determine which processing tasks take precedence at a given time.

If some physical channels overlap in particular domains (e.g. time domain, frequency domain, space domain, code domain, etc.), the UE can drop one of the PUCCH transmissions based on criteria such as: traffic type (mobile broadband (MBB) versus Ultra-Reliable Low-Latency Communication (URLLC)); uplink control information (UCI) payload size; cell type (source versus target). In a particular example, if the PUCCH for the source cell and the target cell overlap on some resources, the UE may drop the PUCCH with a smaller UCI payload or the UCI of a first PUCCH is sent on a next PUCCH transmission occasion.

If the network configures the UE with parameters that result in the UE exceeding its capability in some way (e.g. PDCCH candidate monitoring, PUCCH transmission, UL power control), the UE can drop the processing of tasks that exceed the capability that the UE previously reported to the network.

For example, if the UE reports a capability of performing N PDCCH blind detections per transmission resource, wherein N is an integer, such as a slot, per serving cell and the network configures a serving cell (e.g. source or target) with CORESETs and Search Space sets in a manner such that the UE would need to perform N'>N PDCCH blind detections per slot to look for a PDCCH message, the UE is not expected to perform more than N PDCCH blind detections on the corresponding cell.

In another example, if the UE reports a capability of dynamic or semi-static uplink power control and the network configures maximum transmit powers that exceed the total transmit power that the UE is capable of transmitting, the UE is not expected to transmit at a power higher than its maximum transmit power.

In some embodiments, the UE can report a capability allowing the network to configure the UE to perform a mobility procedure that reduces and may eliminate service interruption. This occurs because the network can configure the UE with two serving cells in order for the UE to receive transmissions simultaneously from both source and target cells.

Furthermore, the network can configure the UE with two serving cells in order to transmit transmissions simultaneously to source and target cells or to transmit in an orthogonal manner (e.g. in the time domain, frequency domain, code domain, spatial domain, etc.) to source and target cells.

Based on the content of the UE capability report, the network can configure the UE in a way that allows it to perform a handover by reducing or possibly eliminating service interruption.

In a situation where the UE is at an edge of a serving cell adjacent a target cell, the network can instruct the UE to monitor for PDCCH candidates from both source and target cells while the handover is being performed. Similarly the network can instruct the UE to transmit PUCCH, in correspondence to PDSCH transmissions, to both source and target cells while the handover is being performed.

Figure 8:
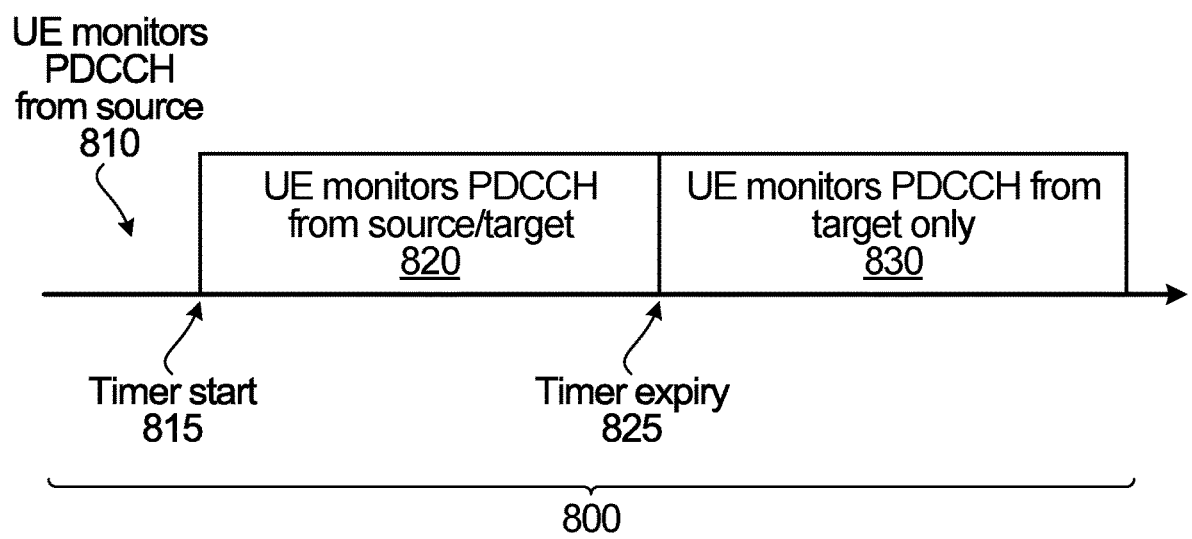
FIG. 8 illustrates an example of using a timer for determining a duration of monitoring a PDCCH or both a source cell and a target cell.

In some embodiments, the priority based rules may be timer based. FIG. 8 illustrates a duration of time 800 over which a handover may occur. In this illustrated figure, the UE monitors both the source and target cell only for a maximum of a finite duration of the timer. Once the timer expires, the UE then monitors only the target cell. In the particular example, for a duration of time 810 before the handover occurs the UE monitors PDCCH from only the source cell. When a handover is going to occur, a timer may start 815. While the time is running 820 the UE monitors PDCCH from both the source cell and the target cell. The time expires 825, after which time the UE monitors PDCCH from the target only 830. In this example the UE may switch to monitoring the PDCCH from only the target cell before the timer expires, but will not monitor the PDCCH of both the target and source cells beyond the expiry of the timer.

Figure 9B:
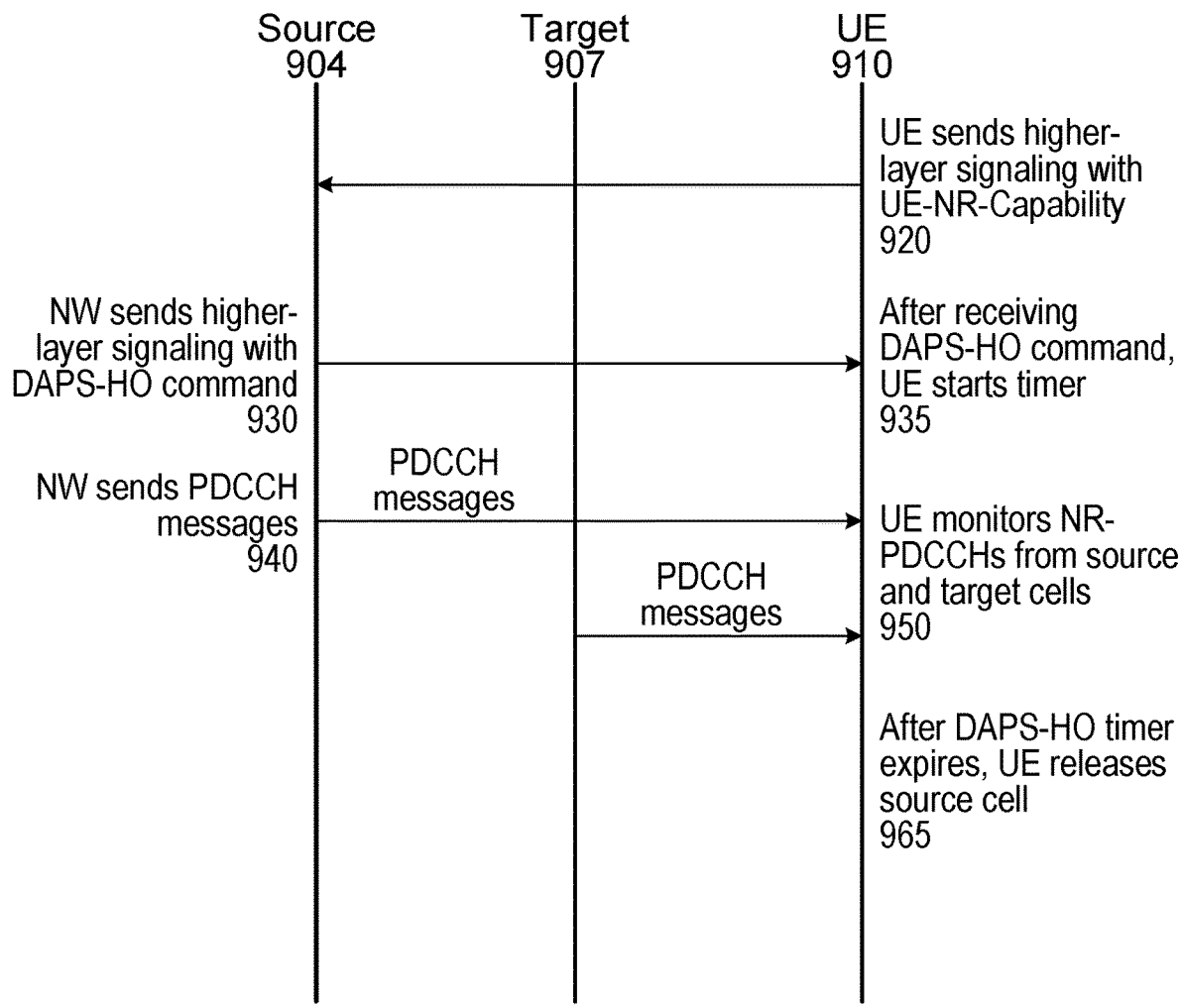
FIG. 9B is a signal flow diagram illustrating a second example of a simultaneous handover by a UE from a source cell to a target cell involving a timer according to an embodiment of the present disclosure.

FIG. 9B is an example signal flow diagram illustrating signaling that occurs between a UE 910 and a source cell 904 and the UE 910 and a target cell 907 when a timer is used. The source cell 904 and the target cell 907 are part of a network that the UE 910 is communicating over. Processing being performed by the network, such as generating a DAPS-HO command based on the UE capability information provided by the UE 910, may be localized near one of the target cell 907 or the source cell 904 or somewhere else in the network. At some point prior to the possibility of a handover from the source cell 904 to the target cell 907, the UE 910 sends 920 a higher layer signaling message that includes UE-NR-Capability information. This information may include capability information regarding many capabilities that the UE 910 supports, part of which is related to DAPS-HO capability or the capability information that is being sent to the network as a given time may be only relating to DAPS-HO capabilities that the UE 910 supports. The higher-layer signaling may be RRC signaling. At some point in time after the source cell 904 receives the UE capability information, the network generates a DAPS-HO command and the source cell 904 sends 930 the DAPS-HO command to the UE 910. At some point after receiving the DAPS-HO command, the UE 910 starts 935 a timer, which if the UE 910 has not switched to the target cell 907 by the expiry of the timer, the UE 910 will drop the source cell 904. At 940 the source cell 904 and the target cell 907 send PDDCH messages. At 950, the UE 910 monitors for PDCCH messages sent by the source cell 904 and the target cell 907 sent at step 940. As indicated above, if the UE 910 has not released the source cell 904 by the time the timer has expired, the UE 910 proceeds to release 965 the source cell 904.

In embodiments of the present disclosure, if the source and target cell are using exactly the same BWP bandwidth, which will be compatible with the assumptions used in multi-TRP where the TRPs are using the same DL BWP (i.e. the same DL BWP bandwidth), the features supported in the multi-TRP framework are applicable to the intra-frequency DAPS-HO case in general.

In some embodiments, for DAPS-HO, the UE monitors PDCCH candidates for search space sets belonging to the source and target cells in the same slot. Search space sets are configured for a primary cell of a master cell group (MCG). A given primary cell of a given MCG is either the source or target cell.

In some embodiments, for UEs not capable of simultaneous transmission, for intra-frequency DAPS-HO, the UE sends separate PUCCH transmissions to source and target cells in accordance with the agreements in the multi-TRP framework. For other cases of DAPS-HO, the UE sends PUCCH carrying HARQ-ACK according to existing Rel. 15 specification. For UEs capable of simultaneous transmission, PUCCH transmissions to source and target cells carrying HARQ-ACK are sent in the same slot.

In some embodiments, if the source and target cells are both in the same frequency range and are using the same DL and UL BWPs, the UE may determine downlink pathloss estimates separately for each cell based on reference signals (RSs) by those cells, but UL Power Control may eventually be performed in a joint manner using semi-static power sharing. For DAPS-HO, power sharing is assumed for Uplink Power Control for PUCCH for UEs indicating DAPS-HO with simultaneous transmission capability. A power sharing mechanism supported in Rel-16 NR-New Radio Dual Connectivity (NR DC) with frequency range 1 (FR1)+FR1 band combinations applies to the power sharing for DAPS-HO.

In some embodiments, simultaneous connectivity is dependent on the level of granularity, e.g. slot-based. If TDM patterns are defined on a granularity smaller than slots, it is still possible to configure UEs to receive PDCCHs and transmit PUCCHs in a manner that appears simultaneous in FR2. For FR2 UEs, support TDM-based reception of PDCCH/PDSCH from source and target gNBs for DAPS-HO. For FR2 UEs, support TDM-based transmission of PUCCH/PUSCH to source and target gNBs for DAPS-HO.

In some embodiments, while DAPS-HO is taking place, UEs are expected not to be in discontinuous reception (DRX) operation mode or to be configured with the same DRX periodicity during DAPS-HO operation. For each band or band combination that the UE reports DAPS-HO support on, the UE can further indicate which features it supports for DAPS-HO, features such as simultaneous reception, simultaneous transmission, and so on. DAPS-HO capability is reported per band and/or per band combination In some embodiments, for each supported band or band combination, the UE reports a set of supported features, e.g. simultaneous PDCCH reception, PDSCH with full/partial/no overlap, multiple Timing Advance, dynamic or semi-static UL power control, etc.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the figures or all of the portions schematically shown in the

What is claimed is:

1. A method comprising:
a user equipment (UE) selecting dual active protocol stack handover (DAPS-HO) UE capability information to provide to a network, the capability information indicating functionality supported by the UE during a handover from a source cell to a target cell, wherein the capability information includes uplink (UL) power sharing information indicating whether dynamic and/or semi-static UL power sharing between the source cell and the target cell is supported;
the UE transmitting the selected DAPS-HO capability information to the network; and
the UE receiving a DAPS-HO command from the network for performing the DAPS-HO.

2. The method of claim 1, wherein transmitting the selected DAPS-HO capability information to the network comprises transmitting the selected DAPS-HO capability information as a subset of parameters of radio frequency (RF) parameters supported by the UE.

3. The method of claim 1, wherein the DAPS-HO UE capability information that can be selected from includes one or more parameters of:
simultaneous reception of physical downlink control channel (PDCCH) from a source cell and a target cell;
simultaneous reception of physical downlink shared channel (PDSCH) from a source cell and a target cell;
simultaneous transmission of physical uplink control channel (PUCCH) from a source cell and a target cell;
simultaneous transmission of physical uplink shared channel (PUSCH) from a source cell and a target cell;
multiple timing advance;
band identifier (bandId);
time division multiplexing (tdm) pattern for PDCCH;
tdm pattern for PDSCH;
tdm pattern for PUCCH;
tdm pattern for PUSCH; or
maximum number of candidate target cells.

4. The method of claim 1, wherein transmitting the selected DAPS-HO capability information to the network comprises transmitting the selected DAPS-HO capability information as a subset of a band combination list parameter.

5. The method of claim 1, wherein transmitting the selected DAPS-HO capability information to the network comprises transmitting the selected DAPS-HO capability information as a subset of a DAPS-HO list parameter.

6. The method of claim 1, wherein transmitting the selected DAPS-HO capability information to the network comprises transmitting the selected DAPS-HO capability information as a subset of a feature set parameter.

7. A method comprising:
a network receiving dual active protocol stack handover (DAPS-HO) UE capability information from a UE, the capability information indicating functionality supported by the UE during a handover from a source cell to a target cell, wherein the capability information includes uplink (UL) power sharing information indicating whether dynamic and/or semi-static UL power sharing between the source cell and the target cell is supported; and
the network transmitting a DAPS-HO command to the UE for performing the DAPS-HO.

8. The method of claim 7, wherein receiving the DAPS-HO capability information comprises receiving the DAPS-HO capability information as a subset of parameters of radio frequency (RF) parameters supported by the UE.

9. The method of claim 7, wherein DAPS-HO UE capability information includes one or more parameters of:
simultaneous reception of physical downlink control channel (PDCCH) from a source cell and a target cell;
simultaneous reception of physical downlink shared channel (PDSCH) from a source cell and a target cell;
simultaneous transmission of physical uplink control channel (PUCCH) from a source cell and a target cell;
simultaneous transmission of physical uplink shared channel (PUSCH) from a source cell and a target cell;
multiple timing advance;
band identifier (bandId);
time division multiplexing (tdm) pattern for PDCCH;
tdm pattern for PDSCH;
tdm pattern for PUCCH;
tdm pattern for PUSCH; or
maximum number of candidate target cells.

10. The method of claim 7, wherein receiving the DAPS-HO capability information comprises receiving the DAPS-HO capability information as a subset of a band combination list parameter.

11. The method of claim 7, wherein receiving the DAPS-HO capability information comprises receiving the DAPS-HO capability information as a subset of a DAPS-HO list parameter.

12. The method of claim 7, wherein receiving the DAPS-HO capability information comprises receiving the DAPS-HO capability information as a subset of a feature set parameter.

13. A device comprising:
a processor; and
non-transitory computer readable media, having stored thereon processor executable instructions, that when executed, cause the device to:
select dual active protocol stack handover (DAPS-HO) device capability information to provide to a network, the capability information indicating functionality supported by the device during a handover from a source cell to a target cell, wherein the capability information includes uplink (UL) power sharing information indicating whether dynamic and/or semi-static UL power sharing between the source cell and the target cell is supported;
transmit the selected DAPS-HO capability information to the network; and
receive a DAPS-HO command from the network for performing the DAPS-HO.

14. The device of claim 13, wherein the processor executable instructions that cause the device to transmit the selected DAPS-HO capability information, when executed, cause the device to transmit the selected DAPS-HO capability information as a subset of parameters of radio frequency (RF) parameters supported by the UE.

15. The device of claim 13, wherein the DAPS-HO UE capability information that can be selected from includes one or more parameters of:

simultaneous reception of physical downlink control channel (PDCCH) from a source cell and a target cell;
simultaneous reception of physical downlink shared channel (PDSCH) from a source cell and a target cell;
simultaneous transmission of physical uplink control channel (PUCCH) from a source cell and a target cell;
simultaneous transmission of physical uplink shared channel (PUSCH) from a source cell and a target cell;
multiple timing advance;
band identifier (bandId);
time division multiplexing (tdm) pattern for PDCCH;
tdm pattern for PDSCH;
tdm pattern for PUCCH;
tdm pattern for PUSCH; or
maximum number of candidate target cells.

16. The device of claim 13, wherein the processor executable instructions that cause the device to transmit the selected DAPS-HO capability information, when executed, cause the device to transmit the selected DAPS-HO capability information as a subset of a band combination list parameter.

17. A device comprising:
a processor; and
non-transitory computer readable media, having stored thereon processor executable instructions, that when executed, cause the device to:
receive dual active protocol stack handover (DAPS-HO) UE capability information from a UE, the capability information indicating functionality supported by the UE during a handover from a source cell to a target cell, wherein the capability information includes uplink (UL) power sharing information indicating whether dynamic and/or semi-static UL power sharing between the source cell and the target cell is supported; and
transmit a DAPS-HO command to the UE for performing the DAPS-HO.

18. The device of claim 17, wherein the processor executable instructions that cause the device to receive the selected DAPS-HO capability information, when executed, cause the device to receive the DAPS-HO capability information as a subset of parameters of radio frequency (RF) parameters supported by the UE.

19. The device of claim 17, wherein DAPS-HO UE capability information includes one or more parameters of:
simultaneous reception of physical downlink control channel (PDCCH) from a source cell and a target cell;
simultaneous reception of physical downlink shared channel (PDSCH) from a source cell and a target cell;
simultaneous transmission of physical uplink control channel (PUCCH) from a source cell and a target cell;
simultaneous transmission of physical uplink shared channel (PUSCH) from a source cell and a target cell;
multiple timing advance;
band identifier (bandId);
time division multiplexing (tdm) pattern for PDCCH;
tdm pattern for PDSCH;
tdm pattern for PUCCH;
tdm pattern for PUSCH; or
maximum number of candidate target cells.

20. The device of claim 17, wherein the processor executable instructions that cause the device to receive the selected DAPS-HO capability information, when executed, cause the device to receive the DAPS-HO capability information as a subset of a band combination list parameter.

* * * * *